(12) United States Patent
Asami

(10) Patent No.: US 8,289,628 B2
(45) Date of Patent: Oct. 16, 2012

(54) IMAGING LENS AND IMAGING APPARATUS

(75) Inventor: Taro Asami, Saitama (JP)

(73) Assignee: Fujifilm Corporation, Tokyo (JP)

( * ) Notice: Subject to any disclaimer, the term of this patent is extended or adjusted under 35 U.S.C. 154(b) by 98 days.

(21) Appl. No.: 12/949,161

(22) Filed: Nov. 18, 2010

(65) Prior Publication Data

US 2011/0122512 A1    May 26, 2011

(30) Foreign Application Priority Data

Nov. 20, 2009 (JP) ................................. 2009-264998

(51) Int. Cl.
*G02B 3/02* (2006.01)
*G02B 13/18* (2006.01)
*G02B 13/04* (2006.01)
*G02B 9/60* (2006.01)

(52) U.S. Cl. ......... 359/714; 359/733; 359/753; 359/770
(58) Field of Classification Search .................. 359/708, 359/713, 714, 733, 749–756, 762, 763, 770
See application file for complete search history.

(56) References Cited

U.S. PATENT DOCUMENTS

| | | | |
|---|---|---|---|
| 5,933,286 A * | 8/1999 | Yamada et al. | ............... 359/770 |
| 7,298,561 B1 | 11/2007 | Yamashita | |
| 7,471,465 B2 | 12/2008 | Yamashita | |
| 7,697,210 B2 | 4/2010 | Lang et al. | |
| 2005/0174463 A1 | 8/2005 | Ohzawa et al. | |
| 2006/0187557 A1 | 8/2006 | Yamakawa | |
| 2008/0037138 A1 | 2/2008 | Lang et al. | |
| 2009/0073577 A1 * | 3/2009 | Jung et al. | ..................... 359/717 |
| 2010/0091379 A1 | 4/2010 | Lang et al. | |
| 2010/0277816 A1 * | 11/2010 | Kweon et al. | ................. 359/755 |

FOREIGN PATENT DOCUMENTS

| | | |
|---|---|---|
| EP | 1 830 211 | 9/2007 |
| JP | 2001-281544 | 10/2001 |
| JP | 2005-227426 | 8/2005 |
| JP | 2008-122922 | 5/2008 |
| JP | 2009-216956 | 9/2009 |

OTHER PUBLICATIONS

European Search Report—EP 10 19 1642—Feb. 16, 2011.
European Search Report—EP 10 19 1642—Nov. 11, 2011.

* cited by examiner

*Primary Examiner* — Darryl J Collins
(74) *Attorney, Agent, or Firm* — Young & Thompson

(57) ABSTRACT

An imaging lens includes negative first lens, negative second lens having a concave surface facing the image side, positive third lens, aperture stop, positive fourth lens, and fifth lens having a concave surface facing the object side, which are arranged sequentially from the object side. At least one of second lens, fourth lens and fifth lens has at least an aspheric surface. The Abbe number of third lens and the Abbe number of fifth lens are less than or equal to 30, and the Abbe number of fourth lens is greater than or equal to 40. Further, the following formula (1) is satisfied:

$$1.0 < (R3-R4)/(R3+R4) \qquad (1),$$

where
R3: the paraxial curvature radius of an object-side surface of second lens, and
R4: the paraxial curvature radius of an image-side surface of second lens.

20 Claims, 15 Drawing Sheets

EXAMPLE 1

EXAMPLE 1

EXAMPLE 2

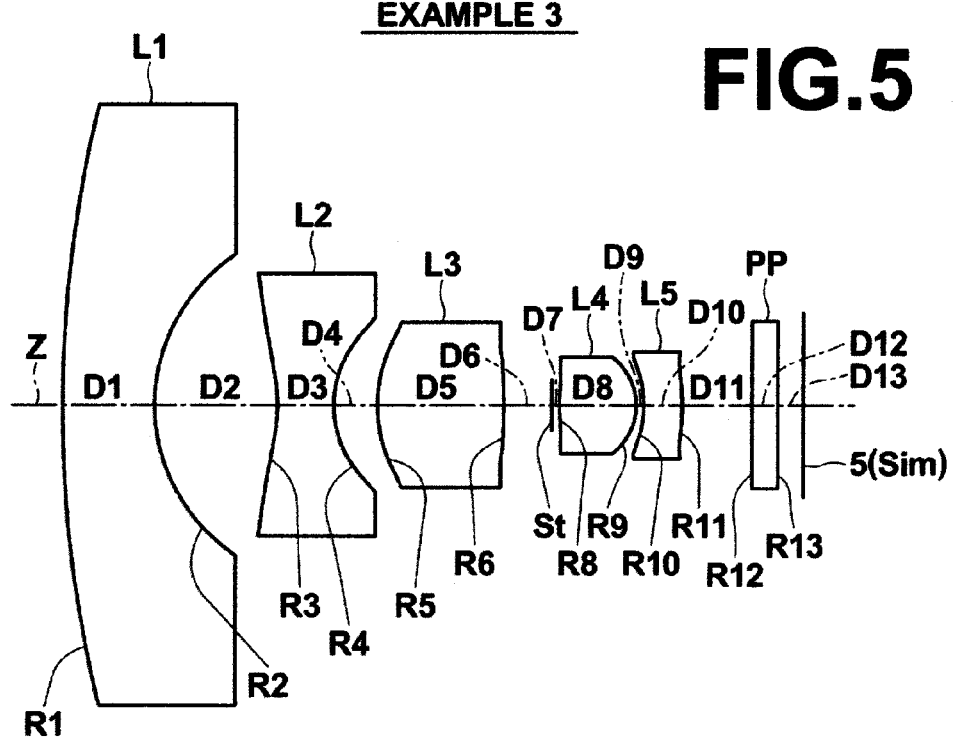
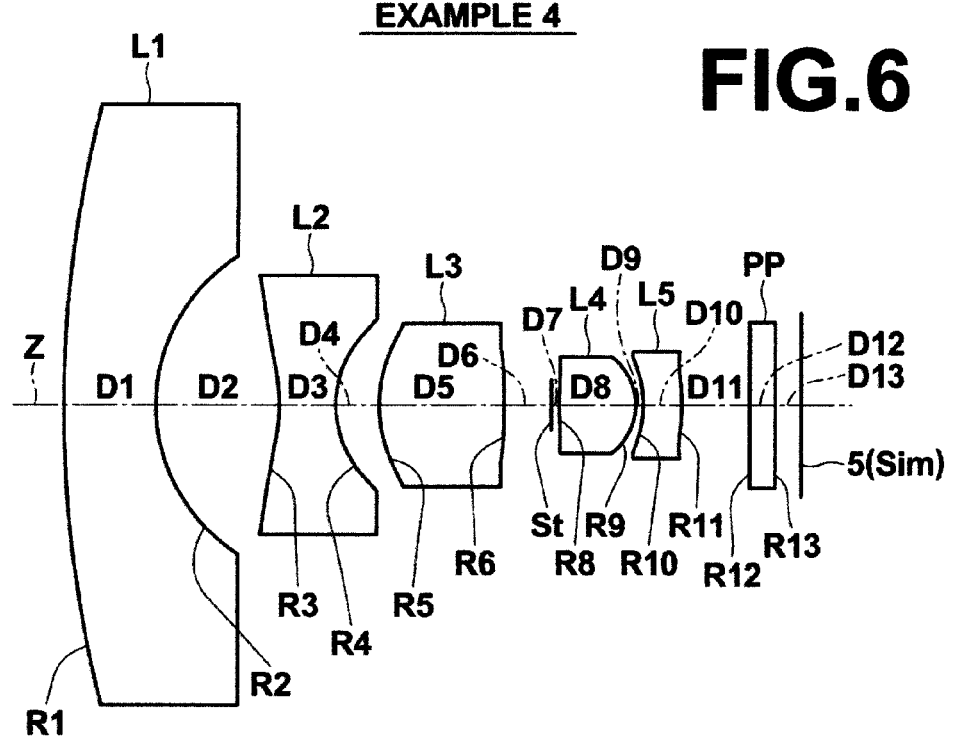

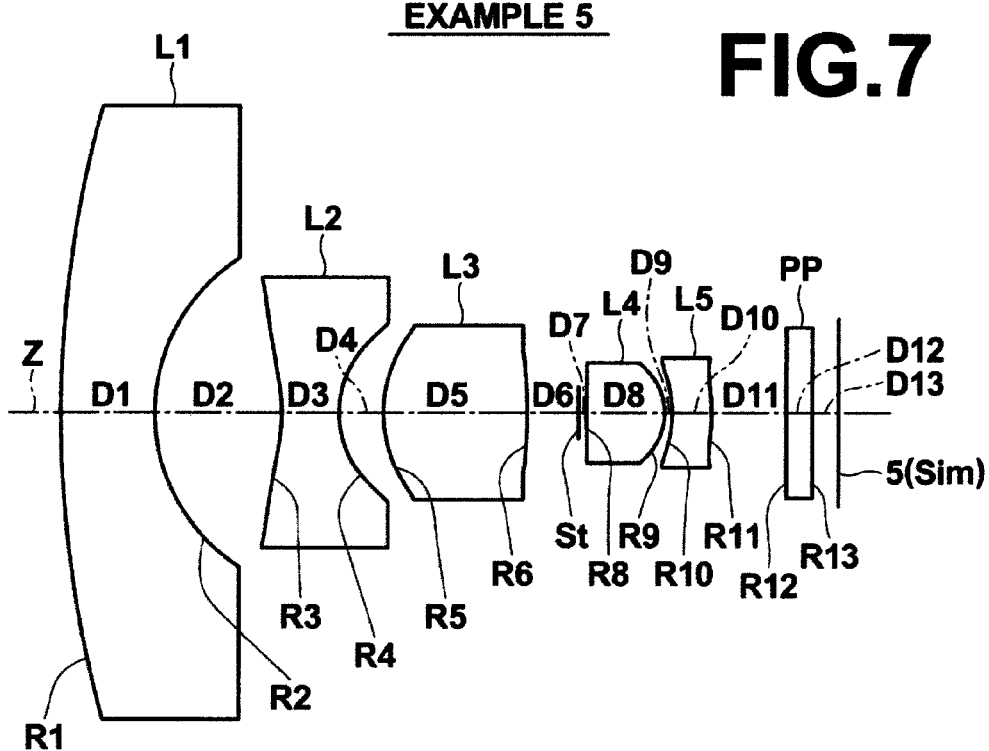
FIG.7 EXAMPLE 5
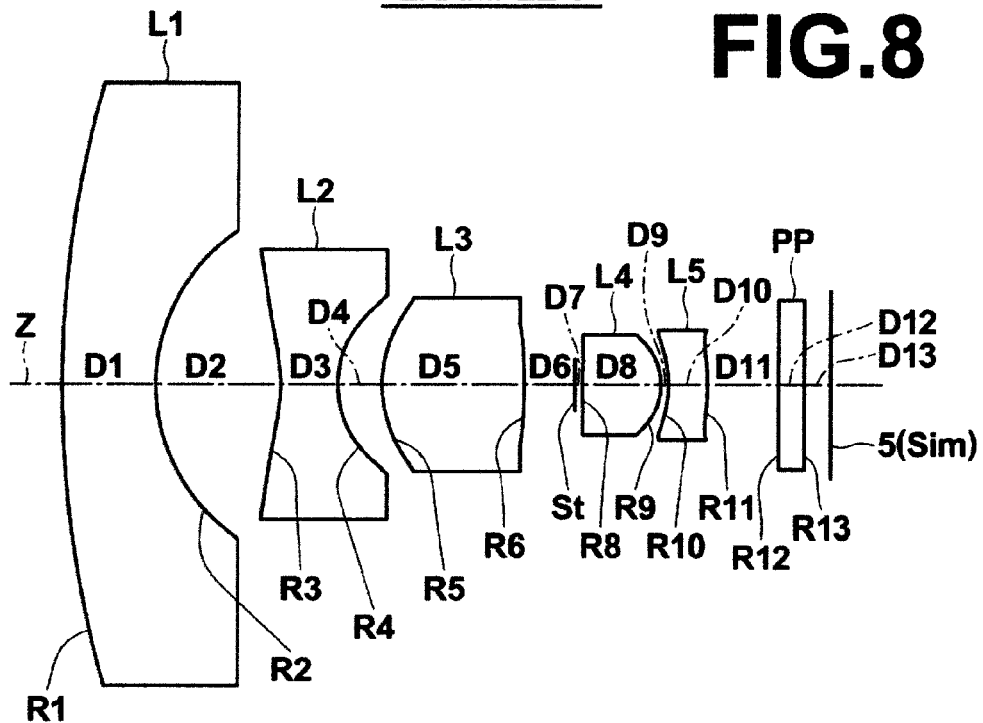
FIG.8 EXAMPLE 6

EXAMPLE 7

EXAMPLE 8

EXAMPLE 1
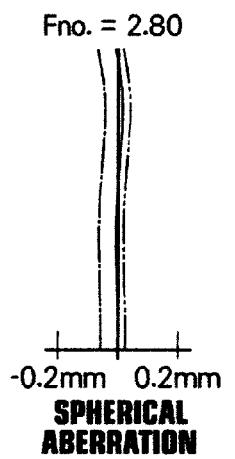
Fno. = 2.80
-0.2mm  0.2mm
SPHERICAL ABERRATION
FIG.11A
—— d-LINE
--- F-LINE
-·- C-LINE
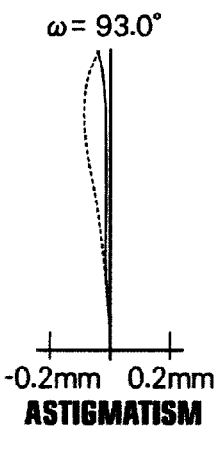
ω = 93.0°
-0.2mm  0.2mm
ASTIGMATISM
FIG.11B
—— SAGITTAL
---- TANGENTIAL
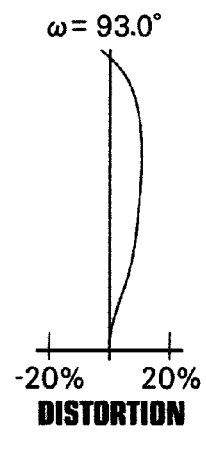
ω = 93.0°
-20%  20%
DISTORTION
FIG.11C
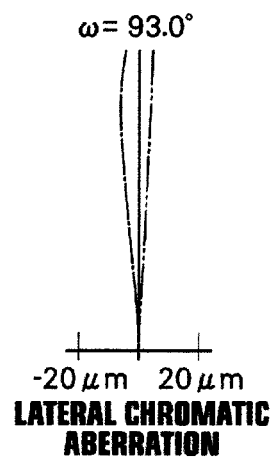
ω = 93.0°
-20μm  20μm
LATERAL CHROMATIC ABERRATION
FIG.11D
FIG.11E 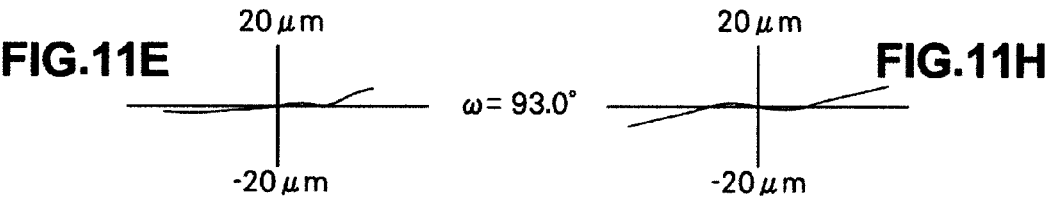 FIG.11H
ω = 93.0°
FIG.11F 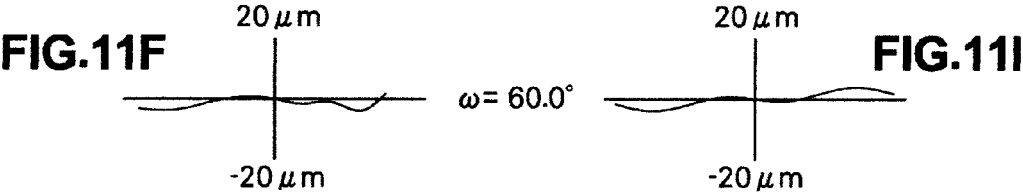 FIG.11I
ω = 60.0°

ω = 0°

EXAMPLE 2
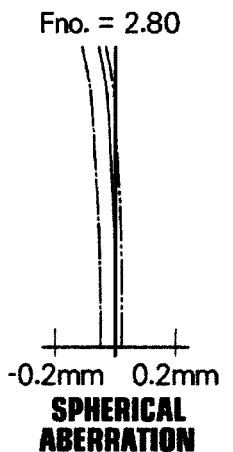
SPHERICAL ABERRATION
FIG.12A
—— d-LINE
--- F-LINE
---- C-LINE
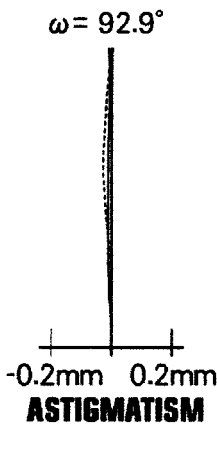
ASTIGMATISM
FIG.12B
—— SAGITTAL
---- TANGENTIAL
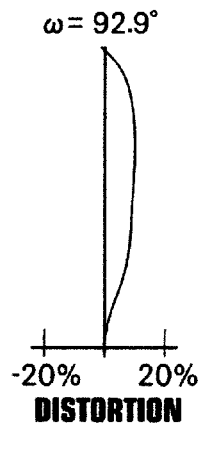
DISTORTION
FIG.12C
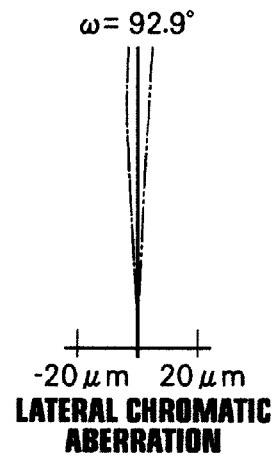
LATERAL CHROMATIC ABERRATION
FIG.12D
FIG.12E 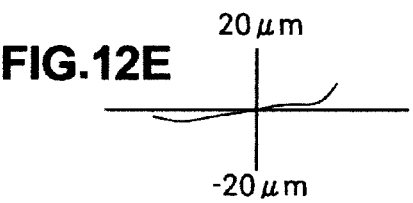 ω= 92.9° 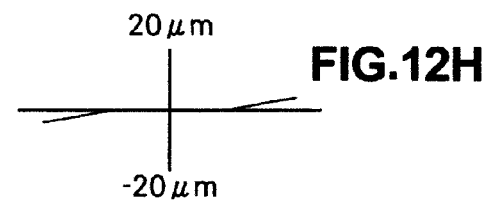 FIG.12H
  ω= 61.2° FIG.12I
  ω= 0°

EXAMPLE 3
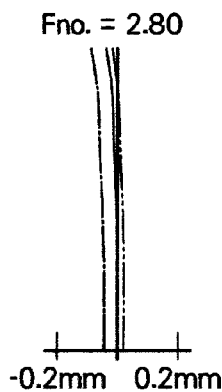
Fno. = 2.80
-0.2mm  0.2mm
SPHERICAL ABERRATION
FIG.13A
— d-LINE
--- F-LINE
---- C-LINE
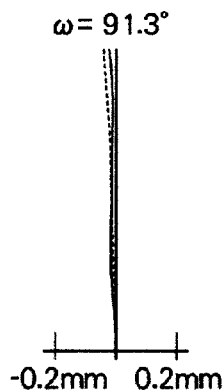
ω = 91.3°
-0.2mm  0.2mm
ASTIGMATISM
FIG.13B
— SAGITTAL
---- TANGENTIAL
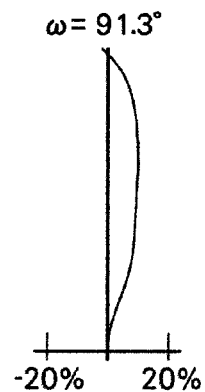
ω = 91.3°
-20%  20%
DISTORTION
FIG.13C
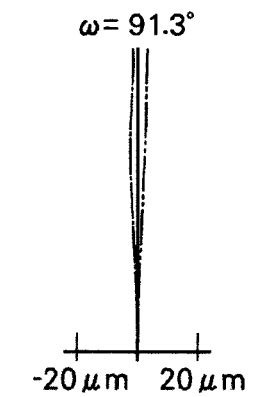
ω = 91.3°
-20μm  20μm
LATERAL CHROMATIC ABERRATION
FIG.13D
FIG.13E 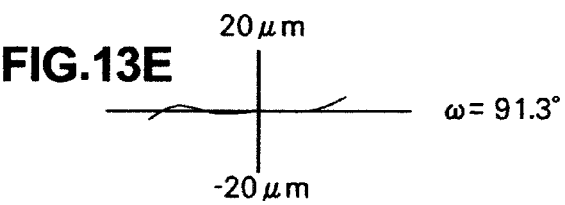 ω = 91.3° 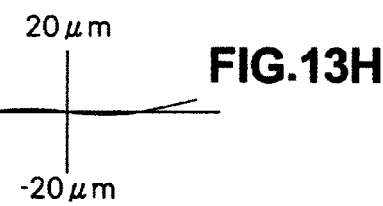 FIG.13H
FIG.13F 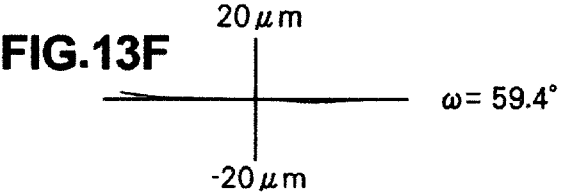 ω = 59.4° 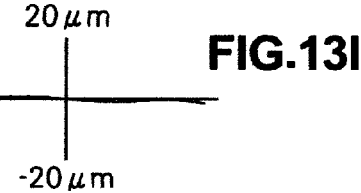 FIG.13I
  ω = 0°

EXAMPLE 5
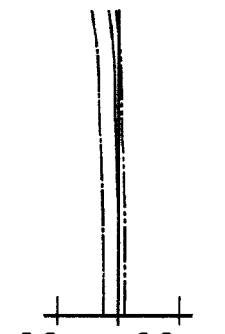
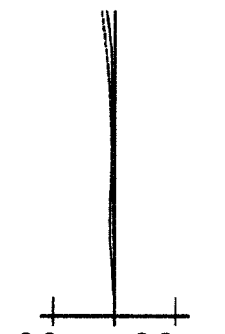
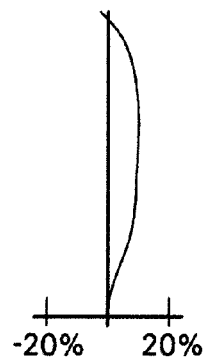
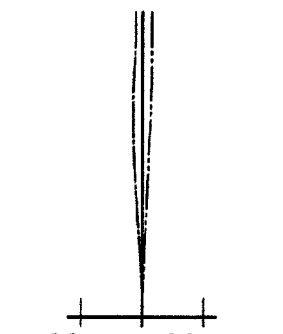
FIG.15A SPHERICAL ABERRATION
— d-LINE
--- F-LINE
---- C-LINE
FIG.15B ASTIGMATISM
— SAGITTAL
---- TANGENTIAL
FIG.15C DISTORTION
FIG.15D LATERAL CHROMATIC ABERRATION
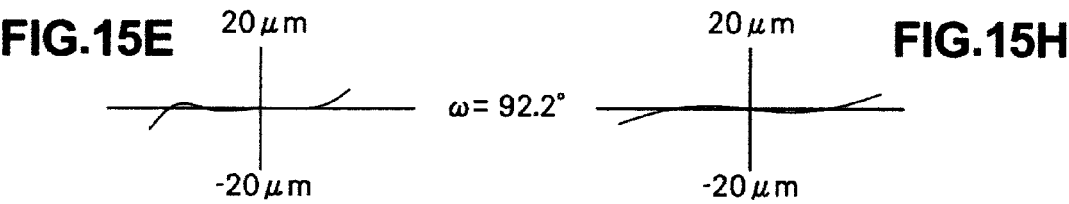
FIG.15E  ω= 92.2°  FIG.15H
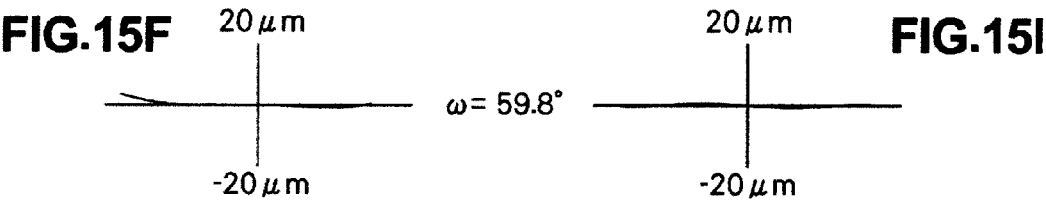
FIG.15F  ω= 59.8°  FIG.15I
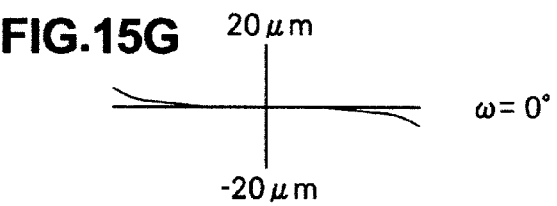
FIG.15G  ω= 0°

EXAMPLE 6
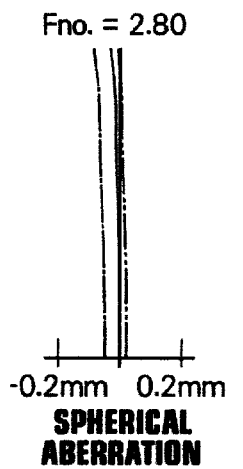
Fno. = 2.80
-0.2mm 0.2mm
SPHERICAL ABERRATION
FIG.16A
— d-LINE
--- F-LINE
---- C-LINE
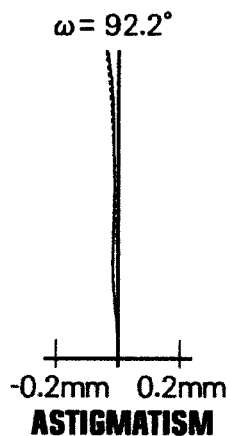
ω= 92.2°
-0.2mm 0.2mm
ASTIGMATISM
FIG.16B
— SAGITTAL
---- TANGENTIAL
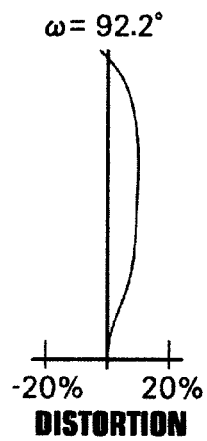
ω= 92.2°
-20% 20%
DISTORTION
FIG.16C
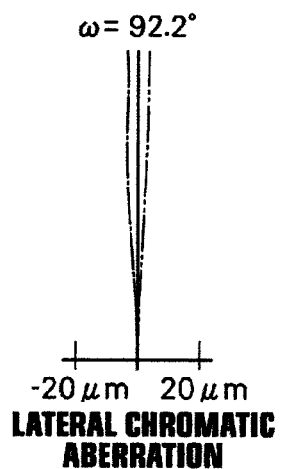
ω= 92.2°
-20μm 20μm
LATERAL CHROMATIC ABERRATION
FIG.16D
FIG.16E 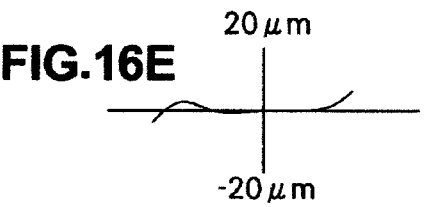 ω= 92.2° 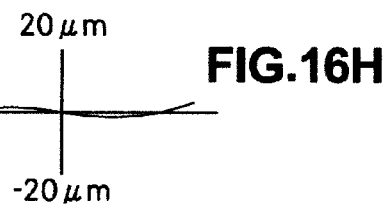 FIG.16H
  ω= 59.9° FIG.16I
  ω= 0°

EXAMPLE 7
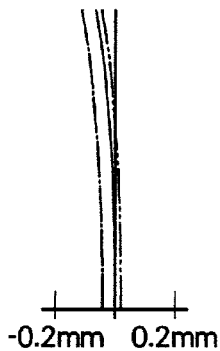
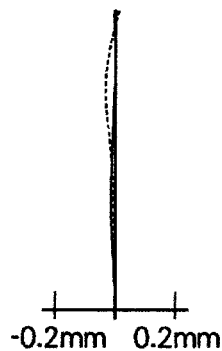
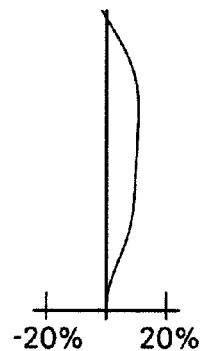
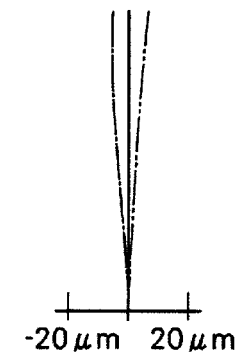
FIG.17A  FIG.17B  FIG.17C  FIG.17D
— d-LINE       — SAGITTAL
--- F-LINE     ---- TANGENTIAL
---- C-LINE
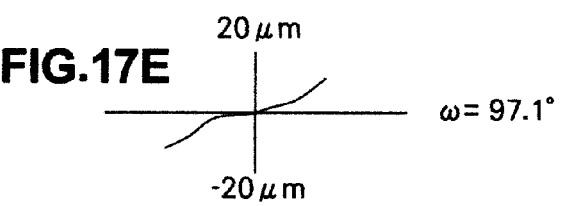
FIG.17E  ω= 97.1°  FIG.17H
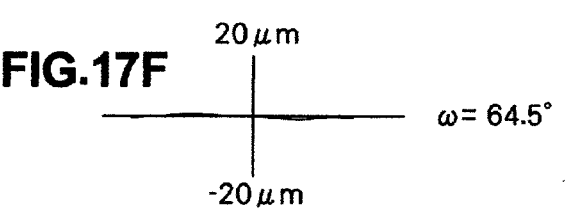
FIG.17F  ω= 64.5°  FIG.17I
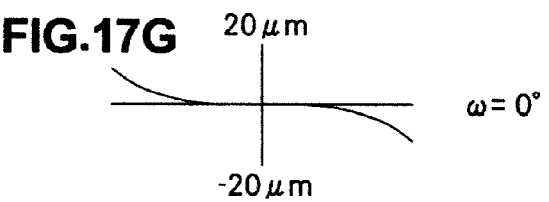
FIG.17G  ω= 0°

EXAMPLE 8
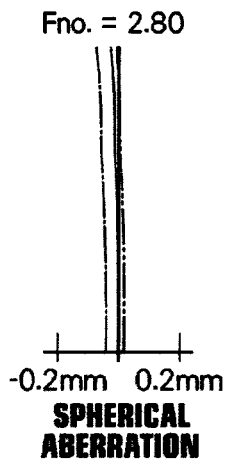
Fno. = 2.80
-0.2mm  0.2mm
SPHERICAL ABERRATION
FIG.18A
— d-LINE
--- F-LINE
---- C-LINE
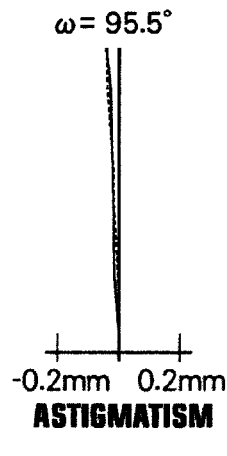
ω = 95.5°
-0.2mm  0.2mm
ASTIGMATISM
FIG.18B
— SAGITTAL
---- TANGENTIAL
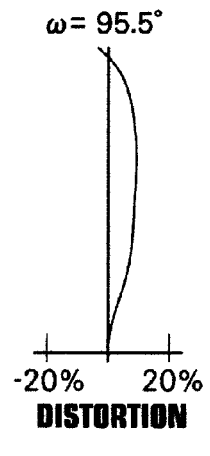
ω = 95.5°
-20%  20%
DISTORTION
FIG.18C
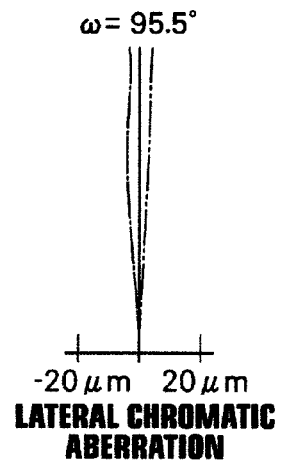
ω = 95.5°
-20μm  20μm
LATERAL CHROMATIC ABERRATION
FIG.18D
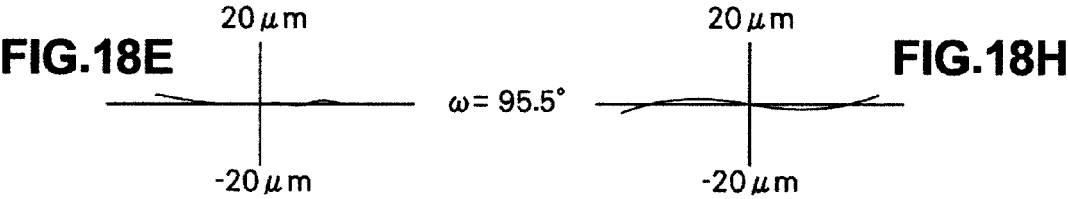
FIG.18E  ω = 95.5°  FIG.18H
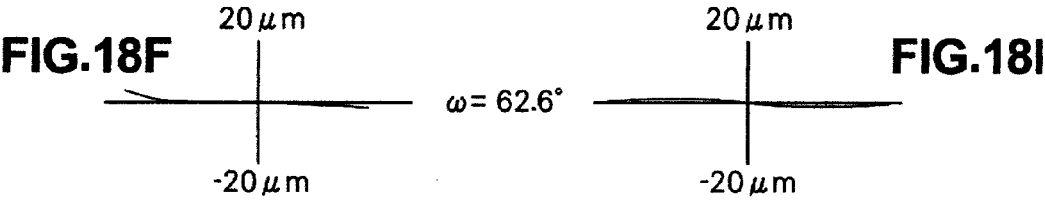
FIG.18F  ω = 62.6°  FIG.18I
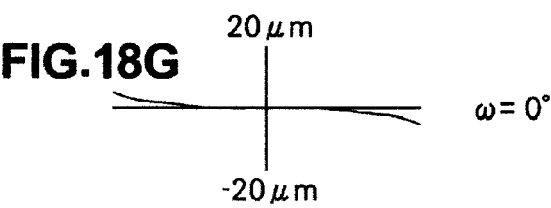
FIG.18G  ω = 0°

IMAGING LENS AND IMAGING APPARATUS

BACKGROUND OF THE INVENTION

1. Field of the Invention

The present invention relates to an imaging lens and an imaging apparatus, and particularly to an imaging lens that is appropriate as a lens for an in-vehicle camera, a camera for a cellular phone, a monitor camera or the like using an imaging device, such as a CCD (Charge Coupled Device) and a CMOS (Complementary Metal Oxide Semiconductor). Further, the present invention relates to an imaging apparatus including the imaging lens.

2. Description of the Related Art

Conventionally, imaging apparatuses, such as in-vehicle cameras, cameras for cellular phones, and monitor cameras, were known. The in-vehicle cameras, which are mounted in cars or the like, photograph the surrounding areas of the vehicles, and the cameras for the cellular phones are mounted on the cellular phones. The monitor cameras are installed to obtain monitor images and to prevent crimes. Generally, these imaging apparatuses include imaging lenses, and imaging devices, such as a CCD and a CMOS, which convert images formed by the imaging lenses into electric signals. The sizes of the imaging devices have been becoming smaller every year, while the resolutions of the imaging devices have been increasing. Consequently, the sizes of the imaging apparatuses including the imaging devices have been becoming smaller. Therefore, there is a growing demand for small and high-performance imaging lenses to be mounted on the imaging apparatuses. Meanwhile, the imaging lenses for the in-vehicle cameras and monitor cameras need to be produced at low cost, and to have high weather-tolerance characteristics, while achieving wide angles, for example, a full angle of view exceeding 180 degrees.

Imaging lenses used in the aforementioned fields are disclosed, for example, in Japanese Unexamined Patent Publication No. 2005-227426 (Patent Document 1), U.S. Pat. No. 7,471,465 (Patent Document 2), U.S. Pat. No. 7,298,561 (Patent Document 3), Japanese Unexamined Patent Publication No. 2008-122922 (Patent Document 4), and U.S. Pat. No. 5,933,286 (Patent Document 5). Patent Documents 1 through 4 disclose five-lens-structure imaging lenses, each including an aspheric lens. Patent Document 5 discloses a five-lens-structure imaging lens in which all of the five lenses are spherical lenses.

In recent years, the sizes of imaging devices became much smaller, while the resolution of the imaging devices became much higher. Therefore, there is a strong demand for small high-performance imaging lenses. Meanwhile, a demand for wider angle-of-view imaging lenses to be used in in-vehicle cameras and monitor cameras remains strong. However, the conventional technique was insufficient to structure a low-cost small lens system, while achieving a wide angle of view and high performance that can cope with high-resolution imaging devices, the resolutions of which became much higher in recent years.

In each of the five-lens-structure imaging lenses disclosed in Patent Documents 1 and 2, the Abbe number of a lens arranged on the most image side (the lens arranged closest to the image side among lenses of the imaging lens) is large. Therefore, it was difficult to correct the longitudinal chromatic aberration of the imaging lens in an excellent manner. In Patent Document 3, the imaging lens includes a cemented lens. Therefore, the imaging lens is inappropriate for use in tough conditions, such as in-vehicle use. Further, the cost is high. The imaging lens disclosed in Patent Document 4 uses many glass lenses. Therefore, the cost is high. In the imaging lens disclosed in Patent Document 5, all of the lenses are spherical lenses. Therefore, the performance of the imaging lens needs to be improved to cope with the increase of resolution in recent years.

SUMMARY OF THE INVENTION

In view of the foregoing circumstances, it is an object of the present invention to provide an imaging lens that is small and that can be produced at low cost. The imaging lens should achieve a sufficiently wide angle of view, and have high optical performance that can cope with an increase in the resolution of an imaging device in recent years. Further, it is another object of the present invention to provide an imaging apparatus including the imaging lens.

A first imaging lens of the present invention is an imaging lens comprising:

a negative first lens;

a negative second lens having a concave surface facing the image side of the imaging lens;

a positive third lens;

an aperture stop;

a positive fourth lens; and a fifth lens having a concave surface facing the object side of the imaging lens, which are arranged sequentially from the object side of the imaging lens, wherein at least one of the second lens, the fourth lens and the fifth lens has at least an aspheric surface, and wherein the Abbe number of the material of the third lens and the Abbe number of the material of the fifth lens for d-line are less than or equal to 30, and wherein the Abbe number of the material of the fourth lens for d-line is greater than or equal to 40, and wherein the following formula (1) is satisfied:

$$1.0 < (R3-R4)/(R3+R4) \qquad (1),$$

where

R3: the paraxial curvature radius of an object-side surface of the second lens, and R4: the paraxial curvature radius of an image-side surface of the second lens.

A second imaging lens of the present invention is an imaging lens comprising:

a negative first lens;

a negative second lens that is a double concave lens;

a positive third lens;

an aperture stop;

a positive fourth lens; and a fifth lens that is a meniscus lens having a concave surface facing the object side of the imaging lens, which are arranged sequentially from the object side of the imaging lens, wherein at least one of the second lens, the fourth lens and the fifth lens has at least an aspheric surface, and wherein the Abbe number of the material of the third lens and the Abbe number of the material of the fifth lens for d-line are less than or equal to 30, and wherein the Abbe number of the material of the fourth lens for d-line is greater than or equal to 40, and wherein an object-side surface of the second lens has negative power at the center thereof, and negative power at an effective diameter edge (an edge of the effective diameter) is weaker than the negative power at the center thereof.

It is desirable that the first imaging lens and the second imaging lens of the present invention satisfy the following formulas (2) through (8). In the embodiments of the present invention, the first imaging lens and the second imaging lens of the present invention may satisfy at least one of the following formulas (2) through (8). Alternatively, two or more arbitrary formulas of the formulas (2) through (8) may be satisfied:

$$1.0 < D3/f < 1.6 \qquad (2);$$

$$2.0 < D2/f < 4.0 \qquad (3);$$

$$1.0 < D1/f < 3.0 \qquad (4);$$

$$13.0 < L/f < 19.0 \qquad (5);$$

$$0.4 < (R1-R2)/(R1+R2) < 1.0 \qquad (6);$$

$$1.1 < (R8-R9)/(R8+R9) < 2.0 \qquad (7); \text{ and}$$

$$0.3 < R9/R10 < 0.9 \qquad (8),$$

where

D3: the center thickness of the second lens, f: the focal length of the entire system of the imaging lens, D2: an air gap between the first lens and the second lens on the optical axis of the imaging lens, D1: the center thickness of the first lens, L: a length from the vertex of an object-side surface of the first lens to an image plane on the optical axis of the imaging lens (backfocus portion is air converted length), R1: the paraxial curvature radius of the object-side surface of the first lens, R2: the paraxial curvature radius of an image-side surface of the first lens, R8: the paraxial curvature radius of an object-side surface of the fourth lens, R9: the paraxial curvature radius of an image-side surface of the fourth lens, and R10: the paraxial curvature radius of the object-side surface of the fifth lens.

In the first imaging lens and the second imaging lens of the present invention, it is desirable that the center thickness of the first lens is greater than or equal to 1.5 mm.

In the first imaging lens and the second imaging lens of the present invention, signs (negative or positive) in the "negative first lens", "negative second lens", "positive third lens", "positive fourth lens" relate to the signs of power (refractive power) in paraxial regions of the lenses. The first imaging lens of the present invention includes the "negative second lens having a concave surface facing the image side of the imaging lens" and the "fifth lens having a concave surface facing the object side of the imaging lens". Further, the second imaging lens of the present invention includes the "negative second lens that is a double concave lens", and the "fifth lens that is a meniscus lens having a concave surface facing the object side of the imaging lens". Further, the preferred embodiments of the present invention describe that "the object-side surface of the first lens is convex". These expressions refer to the form of the lenses in paraxial regions thereof. Further, in the present invention, the sign of the paraxial curvature radius (which is also referred to as "curvature radius at the center") is positive when a surface facing the object side is convex. Further, the sign of the paraxial curvature radius is negative when a surface facing the image side is convex.

Further, the term "effective diameter of a surface" refers to a size corresponding to the diameter of a figure defined by outermost points (points farthest from the optical axis) in the diameter direction among points at which all of rays contributing to image formation intersect the lens surface. Further, the term "effective diameter edge" refers to the outermost points.

The imaging apparatus of the present invention includes the first imaging lens or the second imaging lens of the present invention.

According to the first imaging lens of the present invention, in a lens system composed of at least five lenses, the structure such as the form, power and material of each of the lenses is appropriately set, and the lens system satisfies the formula (1). Therefore, the lens system can be structured at low cost and in small size, and a sufficiently wide angle of view is achieved. Further, an imaging lens having high optical performance that can cope with a high resolution imaging device, the resolution of which sharply increased in recent years, is realized.

According to the second imaging lens of the present invention, in a lens system composed of at least five lenses, the structure such as the form, power and material of each of the lenses is appropriately set, and particularly the form of the object-side surface of the second lens is appropriately set. Therefore, the lens system can be structured at low cost and in small size, and a sufficiently wide angle of view is achieved. Further, an imaging lens having high optical performance that can cope with a high resolution imaging device, the resolution of which sharply increased in recent years, is realized.

The imaging apparatus of the present invention includes the imaging lens of the present invention. Therefore, the imaging apparatus of the present invention can be structured at low cost and in small size, and has a wide angle of view. Further, the imaging apparatus can obtain an excellent high resolution image.

BRIEF DESCRIPTION OF THE DRAWINGS

FIG. 2 is a diagram for explaining the form of an aspheric surface or the like;

FIG. 5 is a cross-section illustrating the lens structure of an imaging lens according to Example 3 of the present invention;

FIG. 6 is a cross-section illustrating the lens structure of an imaging lens according to Example 4 of the present invention;

FIG. 7 is a cross-section illustrating the lens structure of an imaging lens according to Example 5 of the present invention;

FIG. 8 is a cross-section illustrating the lens structure of an imaging lens according to Example 6 of the present invention;

FIGS. 11A through 11I are aberration diagrams of the imaging lens according to Example 1;

FIGS. 12A through 12I are aberration diagrams of the imaging lens according to Example 2;

FIGS. 13A through 13I are aberration diagrams of the imaging lens according to Example 3;

FIGS. 15A through 15I are aberration diagrams of the imaging lens according to Example 5;

FIGS. 16A through 16I are aberration diagrams of the imaging lens according to Example 6;

FIGS. 17A through 17I are aberration diagrams of the imaging lens according to Example 7;

FIGS. 18A through 18I are aberration diagrams of the imaging lens according to Example 8.

DESCRIPTION OF THE PREFERRED EMBODIMENTS

Figure 1:
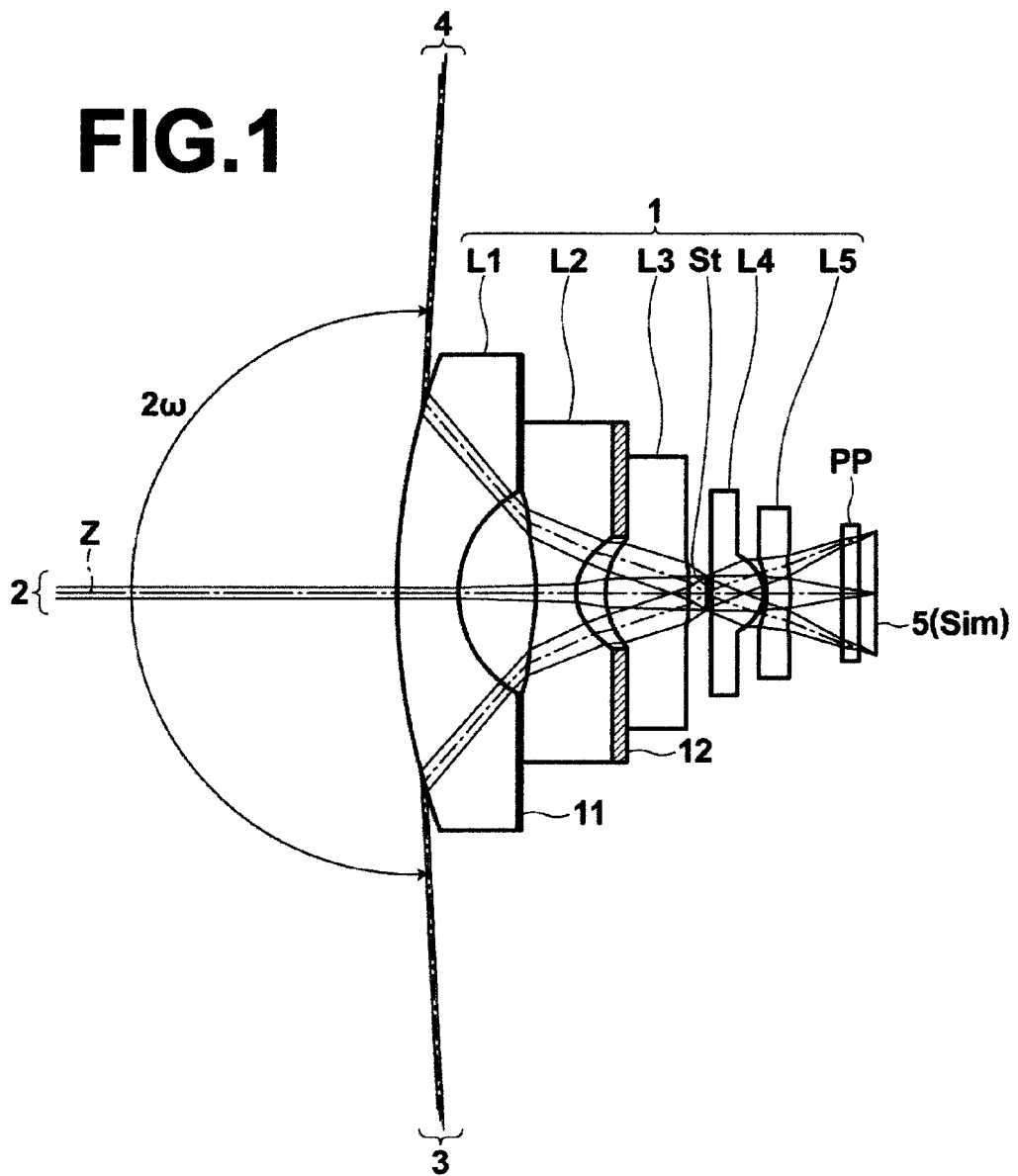
FIG. 1 is a diagram illustrating the optical path of an imaging lens according to an embodiment of the present invention.

Hereinafter, embodiments of the present invention will be described in detail with reference to drawings. First, an imaging lens according to an embodiment of the present invention will be described with reference to FIG. 1. FIG. 1 is a cross-section of an imaging lens 1 according to an embodiment of the present invention. In FIG. 1, an axial beam 2 from an object point at infinity, and off-axial beams 3 and 4 at full angle of view 2ω are illustrated. The left side of FIG. 1 is the object side, and the right side of FIG. 1 is the image side.

In FIG. 1, an imaging device 5 arranged at image plane Sim of the imaging lens 1 is also illustrated, considering a case of applying the imaging lens 1 to an imaging apparatus. The imaging device 5 converts an optical image formed by the imaging lens 1 into electric signals. For example, a CCD (charge coupled device) image sensor, CMOS (complementary metal-oxide semiconductor) image sensor, or the like may be used as the imaging device 5.

When the imaging lens 1 is applied to the imaging apparatus, it is desirable that a cover glass, a low-pass filter or an infrared-ray cut filter, or the like is provided based on the structure of a camera onto which the lens is mounted. FIG. 1 illustrates a case in which parallel-flat-plate-form optical member PP, which assumes these elements, is arranged between the most image side lens and the imaging device 5 (image plane Sim).

The imaging lens 1 illustrated in FIG. 1 includes a first embodiment and a second embodiment of the present invention, which will be described below. The imaging lens 1 according to the first embodiment includes negative first lens L1, negative second lens L2 having a concave surface facing the image side of the imaging lens 1, positive third lens L3, aperture stop St, positive fourth lens L4, and fifth lens L5 having a concave surface facing the object side of the imaging lens 1, which are arranged sequentially from the object side of the imaging lens 1. In the imaging lens 1 of the first embodiment, at least one of the second lens L2, the fourth lens L4 and the fifth lens L5 has at least an aspheric surface. Further, the Abbe number of the material of the third lens L3 and the Abbe number of the material of the fifth lens L5 for d-line are less than or equal to 30, and the Abbe number of the material of the fourth lens L4 for d-line is greater than or equal to 40. Further, the imaging lens 1 of the first embodiment satisfies the following formula (1):

$$1.0 < (R3-R4)/(R3+R4) \tag{1}$$

where

R3: the paraxial curvature radius of the object-side surface of the second lens L2, and R4: the paraxial curvature radius of the image-side surface of the second lens L2.

Since the first lens L1 and the second lens L2 arranged on the object side have negative powers, it is possible to capture rays in a wide angle of view, and to increase the angle of view of the entire system of the imaging lens 1, in other words, a wide angle of view is achieved. Further, since the two negative lenses are used, it is possible to achieve a wide angle of view, for example, exceeding 180 degrees. Further, since the image-side surface of the second lens L2 is concave, it is easily correct distortion, while a wide angle of view is achieved. Since the third lens L3, which is immediately before the aperture stop St, on the object-side of the aperture stop St has a positive power, and the Abbe number of the material of the third lens L3 is less than or equal to 30, it is possible to correct lateral chromatic aberration in an excellent manner as well as field curvature. Further, since the aperture stop St is arranged between the third lens L3 and the fourth lens L4, it is possible to reduce the size of the lens system in the diameter direction, while aberrations are corrected in an excellent manner. In FIG. 1, the aperture stop St represents neither the form nor the size of the aperture stop. The aperture stop St represents the position of the aperture stop ST on the optical axis Z.

Further, since the fourth lens L4 has positive power, and the Abbe number of the material of the fourth lens L4 is greater than or equal to 40, and the fifth lens L5 has a concave surface facing the object side, and the Abbe number of the material of the fifth lens L5 is less than or equal to 30, it is possible to correct longitudinal chromatic aberration in an excellent manner. Further, since at least a surface of at least one of the second lens L2, the fourth lens L4 and the fifth lens L5 is aspheric, it is possible to correct field curvature and spherical aberration in an excellent manner. Further, since the minimum number of lenses of the entire system is five, it is possible to reduce the size and the cost of the lens system.

Further, since the formula (1) is satisfied, it is possible to easily balance the object-side surface of the second lens L2 and the image-side surface of the second lens L2. Further, it is possible to increase the angle of view. Since the second lens L2 is a negative lens having a concave surface facing the image side, and satisfies the formula (1), both surfaces of the second lens L2 are concave in the paraxial region. Therefore, it is possible to easily increase the negative power of the second lens L2. Further, it is possible to easily increase the angle of view of the lens system.

Next, the form of the second lens L2 in the paraxial region will be described. The second lens L2 is a negative lens having a concave surface facing the image side. Here, the form of the object-side surface of the second lens L2 will be considered. First, the formula (1) may be transformed into the following formula (1A):

$$1.0 < (1-R4/R3)/(1+R4/R3) \tag{1A}$$

If the object-side surface of the second lens L2 is flat, in other words, if R3=∞, the formula (1A) is not satisfied. Therefore, the object-side surface of the second lens is not flat.

If the object-side surface of the second lens L2 is convex, in other words, if R3>0, (R3−R4)<(R3+R4), the lower limit of the formula (1) is not satisfied. Therefore, the object-side surface of the second lens L2 is not convex. Hence, the object-side surface of the second lens is concave, and the second lens L2 is a double-concave lens (concave-concave lens, both surfaces of which are concave).

Next, a second embodiment of the imaging lens 1 will be described. The imaging lens 1 of the second embodiment includes negative first lens L1, negative second lens L2 that is a double concave lens, positive third lens L3, aperture stop St, positive fourth lens L4, and fifth lens L5 that is a meniscus lens having a concave surface facing the object side of the imaging lens 1, which are arranged sequentially from the object side of the imaging lens 1. Further, at least one of the second lens L2, the fourth lens L4 and the fifth lens L5 has at least an aspheric surface. The Abbe number of the material of the third lens L3 and the Abbe number of the material of the fifth lens L5 for d-line are less than or equal to 30, and the Abbe number of the material of the fourth lens L4 for d-line is greater than or equal to 40. Further, the object-side surface of the second lens L2 has negative power at the center thereof, and negative power at an effective diameter edge is weaker than the negative power at the center thereof.

Since the second lens L2 is double-concave, it is possible to increase the negative power. Further, it is possible to easily increase the angle of view of the lens system. Further, the center of the object-side surface of the second lens L2 has a negative power, and negative power at the effective diameter edge of the second lens L2 is weaker than that of the center. Therefore, it is possible to easily increase the angle of view, and to correct field curvature and distortion in an excellent manner. Further, since the fifth lens L5 is a meniscus lens having a concave surface facing the object side, it is possible to correct longitudinal chromatic aberration in an excellent manner. In the second embodiment, action and effects of the same elements as those of the first embodiment are the same as the first embodiment. Therefore, explanation about the elements will be omitted.

The imaging lens of the present invention may include both of the first embodiment and the second embodiment. Alternatively, the imaging lens of the present invention may include the first embodiment or the second embodiment. It is desirable that the imaging lens according to the embodiments of the present invention has the following structures. The embodiment of the present invention may include one of the structures. Alternatively, the embodiment of the present invention may include at least two arbitrary structures in combination.

When the paraxial curvature radius of the object-side surface of the second lens L2 is R3, and the paraxial curvature radius of the image-side surface of the second lens L2 is R4, it is desirable that the following formula (1-2) is satisfied:

$$1.0<(R3-R4)/(R3+R4)<30 \qquad (1\text{-}2).$$

If the value exceeds the upper limit of the formula (1-2), the absolute value of the curvature radius of the object-side surface of the second lens L2 becomes small, and it becomes difficult to correct distortion.

Further, it is more desirable that the following formula (1-3) is satisfied:

$$1.0<(R3-R4)/(R3+R4)<20 \qquad (1\text{-}3).$$

When the upper limit of the formula (1-3) is satisfied, it is possible to easily correct distortion.

When the center thickness of the second lens L2 is D3, and the focal length of the entire system of the imaging lens is f, it is desirable that the following formula (2) is satisfied:

$$1.0<D3/f<1.6 \qquad (2).$$

When the upper limit of the formula (2) is satisfied, it is possible to appropriately select the center thickness of the second lend L2. Further, it is possible to separate the axial beam and the off-axial beam from each other at the object-side surface of the first lens L1 and at the object-side surface of the second lens L2. Therefore, it is possible to easy correct field curvature and distortion. When the value becomes higher than or equal to the upper limit of the formula (2), the center thickness of the second lens L2 is too thick, and the size of the lens system becomes large in the diameter direction as well as in the optical axis direction. When the value becomes lower than or equal to the lower limit of the formula (2), the center thickness of the second lens L2 becomes thin, and it becomes difficult to separate the axial beam and the off-axial beam from each other. Hence, it becomes difficult to correct field curvature and distortion.

Further, it is desirable that the following formula (2-2) is satisfied:

$$1.2<D3/f<1.4 \qquad (2\text{-}2).$$

When the formula (2-2) is satisfied, it is possible to improve the effect achieved by satisfying the formula (2).

When the air gap between the first lens L1 and the second lens L2 on optical axis Z of the imaging lens 1 is D2, and the focal length of the entire system of the imaging lens 1 is f, it is desirable that the following formula (3) is satisfied:

$$2.0<D2/f<4.0 \qquad (3).$$

When the formula (3) is satisfied, it is possible to appropriately select an interval (gap, or distance) between the first lens L1 and the second lens L2. Therefore, when the object-side surface of the second lens L2 is aspheric, it is possible to effectively utilize the aspheric form of the object-side surface of the second lens L2. Further, it is possible to easily increase the angle of view, and to correct field curvature in an excellent manner. When the value becomes higher than or equal to the upper limit of the formula (3), the air gap between the first lens L1 and the second lens L2 becomes too wide. Therefore, the size of the lens system becomes large in the diameter direction as well as in the optical axis direction. When the value becomes lower than or equal to the lower limit of the formula (3), the lens system may be small, but the air gap between the first lens L1 and the second lens L2 is too narrow. Therefore, when the object-side surface of the second lens L2 is aspheric, the aspheric form of the aspheric surface is limited. Therefore, it becomes difficult to increase the angle of view. Further, it becomes difficult to separate the axial beam from the off-axial beam. Hence, it becomes difficult to correct field curvature and distortion.

Further, it is more desirable that the following formula (3-2) is satisfied:

$$2.3<D2/f<3.5 \qquad (3\text{-}2).$$

When the formula (3-2) is satisfied, it is possible to improve the effect achieved by satisfying the formula (3).

Further, it is even more desirable to satisfy the following formula (3-3):

$$2.3<D2/f<3.3 \qquad (3\text{-}3).$$

When the formula (3-3) is satisfied, it is possible to easily reduce the size of the imaging lens more than the case of satisfying the formula (3-2).

When the center thickness of the first lens L1 is D1, and the focal length of the entire system of the imaging lens is f, it is desirable that the following formula (4) is satisfied:

$$1.0<D1/f<3.0 \qquad (4).$$

When the formula (4) is satisfied, it is possible to appropriately select the center thickness of the first lens L1.

Further, it is possible to easily reduce the size of the lens system, and to easily improve the shock resistance characteristic of the lens system. When the value becomes higher than or equal to the upper limit of the formula (4), the first lens L1 becomes too thick. In that case, the lens system is resistant to various kinds of shock, but the size of the lens system becomes large both in the optical axis direction and in the diameter direction. When the value is lower than or equal to the lower limit of the formula (4), it is possible to easily reduce the size of the lens system. However, the first lens L1 becomes too thin, and the resistance to shock becomes lower.

Further, it is desirable that the following formula (4-2) is satisfied:

$$1.8<D1/f<2.5 \qquad (4\text{-}2).$$

When the formula (4-2) is satisfied, it is possible to improve the effect achieved by satisfying the formula (4).

Further, it is even more desirable to satisfy the formula (4-3):

$$1.8 < D1/f < 2.3 \quad (4\text{-}3).$$

When the formula (4-3) is satisfied, it is possible to easily reduce the size of the lens system more than the case of satisfying the formula (4-2).

When the imaging lens is used, for example, as a lens for an in-vehicle camera, the imaging lens is required to be resistant to various kinds of shock. Therefore, it is desirable that the center thickness of the first lens L1 is greater than or equal to 1.5 mm. When the thickness of the first lens L1 is such a value, resistance to various kinds of shock increases, and it is possible to produce a lens that is not easily breakable. Further, it is desirable that the center thickness of the first lens L1 is greater than or equal to 1.7 mm to make the lens even less easily breakable. Further, it is even more desirable that the center thickness of the first lens L1 is greater than or equal to 1.8 mm to make the lens less breakable.

Further, it is desirable that the center thickness of the first lens L1 is less than or equal to 3.0 mm. For example, when a wide angle lens, the full angle of view of which exceeds 180 degrees, is produced, if the thickness of the first lens L1 is increased, the size of the first lens L1 in the diameter direction also increases. For example, when the lens is used as a lens for an in-vehicle camera, it is required that the size of the first lens L1 in the diameter direction is small to prevent the appearance of the vehicle from being damaged. When the center thickness of the first lens L1 is less than or equal to 3.0 mm, it is possible to reduce the size of the lens system in the diameter direction as well as in the optical axis direction. Further, when the center thickness of the first lens L1 is less than or equal to 2.5 mm, it is possible to further reduce the size of the lens system.

When the length from the vertex of an object-side surface of the first lens to image plane Sim on the optical axis of the imaging lens is L, and the focal length of the entire system of the imaging lens is f, it is desirable that the following formula (5) is satisfied:

$$13.0 < L/f < 19.0 \quad (5).$$

In calculation of value L, the backfocus portion is an air converted length. Specifically, when a cover glass, a filter or the like is present between the most image side lens and the image plane Sim, an air converted value is used as the thickness of the cover glass, filter, or the like.

When the formula (5) is satisfied, it is possible to reduce the size of the lens system and to increase the angle of view at the same time. When the value becomes higher than or equal to the upper limit of the formula (5), it is possible to easily increase the angle of view, but the size of the lens system becomes large. Further, when the value is less than or equal to the lower limit of the formula (5), it becomes difficult to sufficiently increase the angle of view, or the total length of the lens system becomes too small. Consequently, the size of each lens becomes too small, and it becomes difficult to process the lenses.

Further, it is desirable that the following formula (5-2) is satisfied:

$$14.0 < L/f < 18.0 \quad (5\text{-}2).$$

When the formula (5-2) is satisfied, it is possible to further improve the effect achieved by satisfying the formula (5).

When the object-side surface of the first lens L1 is convex, and the paraxial curvature radius of the object-side surface of the first lens L1 is R1, and the paraxial curvature radius of an image-side surface of the first lens L1 is R2, it is desirable that the following formula (6) is satisfied:

$$0.4 < (R1-R2)/(R1+R2) < 1.0 \quad (6).$$

When the formula (6) is satisfied, it is possible to appropriately select the curvature radius of the object-side surface of the first lens L1 and the curvature radius of the image-side surface of the first lens L1. Further, it is possible to increase the angle of view and to easily correct field curvature and distortion. The first lens L1 is a negative lens. Therefore, when the object-side surface of the first lens L1 is convex, the paraxial region of the first lens L1 has negative meniscus form having a convex surface facing the object side.

When the object-side surface of the first lens L1 is convex, and the value becomes higher than or equal to the upper limit of the formula (6), it is necessary to increase the absolute value of the curvature radius of the object-side surface of the first lens L1 and the absolute value of the curvature radius of the image-side surface of the first lens L1. Consequently, incident rays are sharply refracted by the first lens L1, and it becomes difficult to correct distortion. When the object-side surface of the first lens L1 is convex and the value becomes lower than or equal to the lower limit of the formula (6), the absolute value of the curvature radius of the object-side surface of the first lens L1 and the absolute value of the curvature radius of the image-side surface of the first lens L1 become small. Since the incident rays are condensed without being sharply refracted, it is easily correct distortion. However, field curvature increases, and it becomes difficult to obtain a good image.

Further, it is desirable the following formula (6-2) is satisfied:

$$0.6 < (R1-R2)/(R1+R2) < 0.8 \quad (6\text{-}2).$$

When the formula (6-2) is satisfied, it is possible to improve the effect achieved by satisfying the formula (6).

When the paraxial curvature radius of the object-side surface of the fourth lens L4 is R8, and the paraxial curvature radius of then image-side surface of the fourth lens L4 is R9, it is desirable that the following formula (7) is satisfied:

$$1.1 < (R8-R9)/(R8+R9) < 2.0 \quad (7).$$

When the formula (7) is satisfied, it is possible to appropriately select the curvature radius of the object-side surface of the fourth lens L4 and the curvature radius of the image-side surface of the fourth lens L4. Therefore, it is possible to correct coma aberration and longitudinal chromatic aberration in an excellent manner. Further, it is possible to limit the incident angle of rays in an image peripheral area entering image plane Sim to relatively small degrees. Since the fourth lens L4 has a positive power, when the fourth lens L4 satisfies the formula (7), the paraxial region of the fourth lens L4 is double convex.

Since the fourth lens L4 has a positive power, if the value becomes higher than or equal to the upper limit of the formula (7), the absolute value of the curvature radius of the object-side surface of the fourth lens L4 becomes small, and the absolute value of the curvature radius of the image-side surface of the fourth lens L4 becomes large. Therefore, coma aberration increases. Further, since the absolute value of the curvature radius of the image-side surface of the fourth lens L4 becomes large, it becomes difficult to correct longitudinal chromatic aberration in combination with the fifth lens L5. When the value becomes lower than or equal to the formula (7), the absolute value of the curvature radius of the image-side surface of the fourth lens L4 becomes too small, and it becomes difficult to limit the incident angle of rays in the peripheral area entering the image plane Sim to small degrees. Hence, it becomes difficult to produce a lens that has so-called excellent telecentric characteristic.

Next, the form of the paraxial region of the fourth lens L4 satisfying the formula (7) will be described. First, the formula (7) may be transformed into the following formula (7A):

$$1.1 < (1-R9/R8)/(1+R9/R8) < 2.0 \quad (7A).$$

If the object-side surface of the fourth lens L4 is flat, in other words, if $R8=\infty$, the formula (7A) is not satisfied. Therefore, the object-side surface of the fourth lens L4 is not flat. Similarly, the formula (7) may be transformed into the following formula (7B):

$$1.1 < (R8/R9-1)/(R8/R9+1) < 2.0 \quad (7B).$$

If the image-side surface of the fourth lens L4 is flat, in other words, if $R9=\infty$, the formula (7B) is not satisfied. Therefore, the image-side surface of the fourth lens L4 is not flat.

If the object-side surface of the fourth lens L4 is concave, in other words, if $R8<0$, the fourth lens L4 is a positive lens. Therefore, $R9<0$ and $R8<R9$. However, in such a case, the formula (7) is not satisfied. Therefore, the object-side surface of the fourth lens L4 is not concave. When the object-side surface of the fourth lens L4 is convex, if the image-side surface of the fourth lens L4 is concave, $R8>0$ and $R9>0$, and the formula (7) is not satisfied. Therefore, the fourth lens L4 is not a positive meniscus lens. Hence, the fourth lens L4 is double convex lens.

Further, it is desirable that the following formula (7-2) is satisfied:

$$1.2 < (R8-R9)/(R8+R9) < 1.8 \quad (7-2).$$

When the formula (7-2) is satisfied, it is possible to improve the effect achieved by satisfying the formula (7).

When the paraxial curvature radius of an image-side surface of the fourth lens L4 is R9, and the paraxial curvature radius of the object-side surface of the fifth lens L5 is R10, it is desirable that the following formula (8) is satisfied:

$$0.3 < R9/R10 < 0.9 \quad (8).$$

When the formula (8) is satisfied, it is possible to correct spherical aberration and longitudinal chromatic aberration in an excellent manner. When the value becomes higher than or equal to the upper limit of the formula (8), the absolute value of the curvature radius of the image-side surface of the fourth lens L4 becomes too large. Since the power of the fourth lens L4 becomes weak, it becomes difficult to correct longitudinal chromatic aberration, or the absolute value of the curvature radius of the object-side surface of the fifth lens L5 becomes too small. Hence, it is difficult to limit the incident angle of rays in the image peripheral area entering image plane Sim to small degrees. When the value is lower than or equal to the lower limit of the formula (8), the absolute value of, the curvature radius at the center of the image-side surface of the fourth lens L4 is too small. Hence, it becomes difficult to correct spherical aberration, or the absolute value of the curvature radius of the object-side surface of the fifth lens L5 becomes too large, and the power of the fifth lens L5 becomes weak. Therefore, it is difficult to correct longitudinal chromatic aberration.

Further, it is desirable that the following formula (8-2) is satisfied:

$$0.4 < R9/R10 < 0.8 \quad (8-2).$$

When the formula (8-2) is satisfied, it is possible to improve the effect achieved by satisfying the formula (8).

When the focal length of the fifth lens L5 is f5, and the focal length of the entire system is f, it is desirable that the following formula (9) is satisfied:

$$f5/f < -12.0 \quad (9).$$

When the value becomes higher than or equal to the upper limit of the formula (9), longitudinal chromatic aberration can be corrected in an excellent manner, but if the fifth lens L5 is a negative lens, the power of the fifth lens L5 becomes too strong. Consequently, the incident angle of rays in an image peripheral area entering image plane Sim becomes large, and shading increases.

Further, it is more desirable that the following formula (9-2) is satisfied:

$$-50 < f5/f < -13.0 \quad (9-2).$$

When the upper limit of the formula (9-2) is satisfied, if the fifth lens L5 is a negative lens, it is possible to prevent the power of the fifth lens L5 from becoming too strong and to suppress an increase of shading. When the value satisfies the lower limit of the formula (9-2), it is possible to prevent the negative power of the fifth lens L5 from becoming too weak. Hence, it is possible to easily correct longitudinal chromatic aberration in an excellent manner.

Further, it is more desirable that the following formula (9-3) is satisfied:

$$-30 < f5/f < -13.0 \quad (9-3).$$

When the lower limit of the formula (9-3) is satisfied, it is possible to correct longitudinal chromatic aberration even better than the case of satisfying the formula (9-2).

Further, it is even more desirable that the following formula (9-4) is satisfied:

$$-25 < f5/f < -13.0 \quad (9-4).$$

When the formula (9-4) is satisfied, it is possible to correct longitudinal chromatic aberration even better than the case of satisfying the formula (9-3).

When the paraxial curvature radius of the object-side surface of the fifth lens L5 is R10, and the paraxial curvature radius of the image-side surface of the fifth lens L5 is R11, it is desirable that the following formula (10) is satisfied:

$$-0.5 < (R10-R11)/(R10+R11) < -0.05 \quad (10).$$

When the formula (10) is satisfied, it is possible to appropriately select the curvature radius of the object-side surface of the fifth lens L5 and the curvature radius of the image-side surface of the fifth lens L5, and it is possible to correct spherical aberration in an excellent manner. Further, it is possible to limit the incident angle of rays in an image peripheral area entering image plane Sim to relatively small degrees. Since the object-side surface of the fifth lens L5 is concave, if the value becomes higher than or equal to the upper limit of the formula (10), the fifth lens L5 starts having a weak negative power or a positive power. Therefore, it becomes difficult to correct longitudinal chromatic aberration in an excellent manner. Further, it becomes difficult to maintain long back-focus. When the value becomes lower than or equal to the lower limit of the formula (10), the absolute value of the curvature radius of the object-side surface of the fifth lens L5 becomes too small. In such a case, Longitudinal chromatic aberration can be corrected in an excellent manner, but it becomes difficult to limit the incident angle of peripheral rays entering image plane Sim to small degrees.

Further, it is desirable that the following formula (10-2) is satisfied:

$$-0.3 < (R10-R11)/(R10+R11) < -0.08 \quad (10-2).$$

When the formula (10-2) is satisfied, it is possible to improve the effect achieved by satisfying the formula (10).

When the combined focal length of the first lens L1, the second lens L2 and the third lens L3 is f123, and the combined focal length of the fourth lens L4 and the fifth lens L5 is f45, it is desirable that the following formula (11) is satisfied:

$$-0.8 < f45/f123 < 0.0 \quad (11).$$

When the formula (11) is satisfied, it is possible to effectively select the ratio of the power of the lenses on the image-side of the aperture stop St to that of the lenses on the object-side of the aperture stop St. It is possible to easily increase the angle of view, and to easily correct field curvature and coma aberration. When the value becomes higher than or equal to the upper limit of the formula (11), the power of the lenses on the object-side of the aperture stop St inclines to the positive side, and it becomes difficult to increase the angle of view. Further, it becomes difficult to correct field curvature. When the value becomes lower than or equal to the lower limit of the formula (11), it is possible to easily increase the angle of view, but coma aberration increases.

Further, it is desirable that the following formula (11-2) is satisfied:

$$-0.6 < f45/f123 < -0.2 \quad (11-2).$$

When the formula (11-2) is satisfied, it is possible to improve the effect achieved by satisfying the formula (11).

When the effective diameter of the object-side surface of the first lens L1 is ED1, and the paraxial curvature radius of the object-side surface of the first lens L1 is R1, it is desirable that the following formula (12) is satisfied:

$$0.3 < ED1/R1 < 0.8 \quad (12).$$

When the formula (12) is satisfied, it is possible to limit the effective diameter of the first lens L1 to a small value, and to reduce the area of a lens portion of the first lens L1, the portion being exposed to the outside of the imaging lens 1. Further, it is possible to correct field curvature and distortion in an excellent manner. When the value becomes higher than or equal to the upper limit of the formula (12), the effective diameter of the object-side surface of the first lens L1 is too large, and the size of the lens system in the diameter direction becomes large. For example, when the imaging lens 1 is used as a lens of an in-vehicle camera, if a large area of the first lens L1 is exposed to the outside of the imaging lens 1, the appearance of a car in which the in-vehicle camera is mounted is damaged. Further, since it is desirable that the first lens L1 is a glass lens, as described later, if the size of the first lens L1 becomes large, the cost increases. When the value becomes lower than or equal to the lower limit of the formula (12), it is possible to easily reduce the size of the first lens L1 in the diameter direction, but the effective diameter of the object-side surface of the first lens L1 becomes too small. Therefore, it becomes difficult to separate the axial beam and the peripheral beam from each other. Hence, it becomes difficult to correct field curvature, or the absolute value of the curvature radius of the object-side surface of the first lens L1 becomes too large. Consequently, rays are sharply refracted, and it becomes difficult to correct distortion.

Further, it is desirable that the following formula (12-2) is satisfied:

$$0.4 < ED1/R1 < 0.7 \quad (12-2).$$

When the formula (12-2) is satisfied, it is possible to improve the effect achieved by satisfying the formula (12).

When the combined focal length of the first lens L1 and the second lens L2 is f12, and the focal length of the entire system is f, it is desirable that the following formula (13) is satisfied:

$$-1.5 < f12/f < -0.9 \quad (13).$$

When the formula (13) is satisfied, it is possible to appropriately select the powers of the two negative lenses on the most object side (two negative lenses closest to the object side among lenses of the imaging lens). Therefore, it becomes possible to easily increase the angle of view, and to correct field curvature in an excellent manner. When the value becomes higher than or equal to the upper limit of the formula (13), it is possible to easily increase the angle of view. However, since the powers of the two negative lenses on the most object side become too strong, it becomes difficult to correct field curvature. When the value is lower than or equal to the lower limit of the formula (13), the powers of the two negative lenses on the most object side become too weak, and it becomes difficult to increase the angle of view. Further, it is desirable that the following formula (13-2) is satisfied:

$$-1.4 < f12/f < -1.0 \quad (13-2).$$

When the formula (13-2) is satisfied, it is possible to improve the effect achieved by satisfying the formula (13).

It is desirable that the first lens L1 is a negative meniscus lens having a convex surface facing the object side. Such form of the first lens L1 is advantageous to increase the angle of view. For example, it becomes possible to produce a wide angle lens system having a full angle of view exceeding 180 degrees.

It is desirable that the paraxial region of the second lens L2 is double concave. When the second lens L2 is formed in such a manner, it is possible to increase the negative power of the second lens L2. For example, it becomes possible to achieve a wide angle of view exceeding 180 degrees.

It is desirable that the object-side surface of the second lens L2 is aspheric. Further, it is desirable that the object-side surface of the second lens L2 has a negative power at the center thereof (the curvature radius at the center is negative), and negative power at the effective diameter edge is weaker than the negative power at the center thereof. When the object-side surface of the second lens L2 is formed in such a manner, it is possible to correct field curvature in an excellent manner as well as increasing the angle of view.

Figure 2:
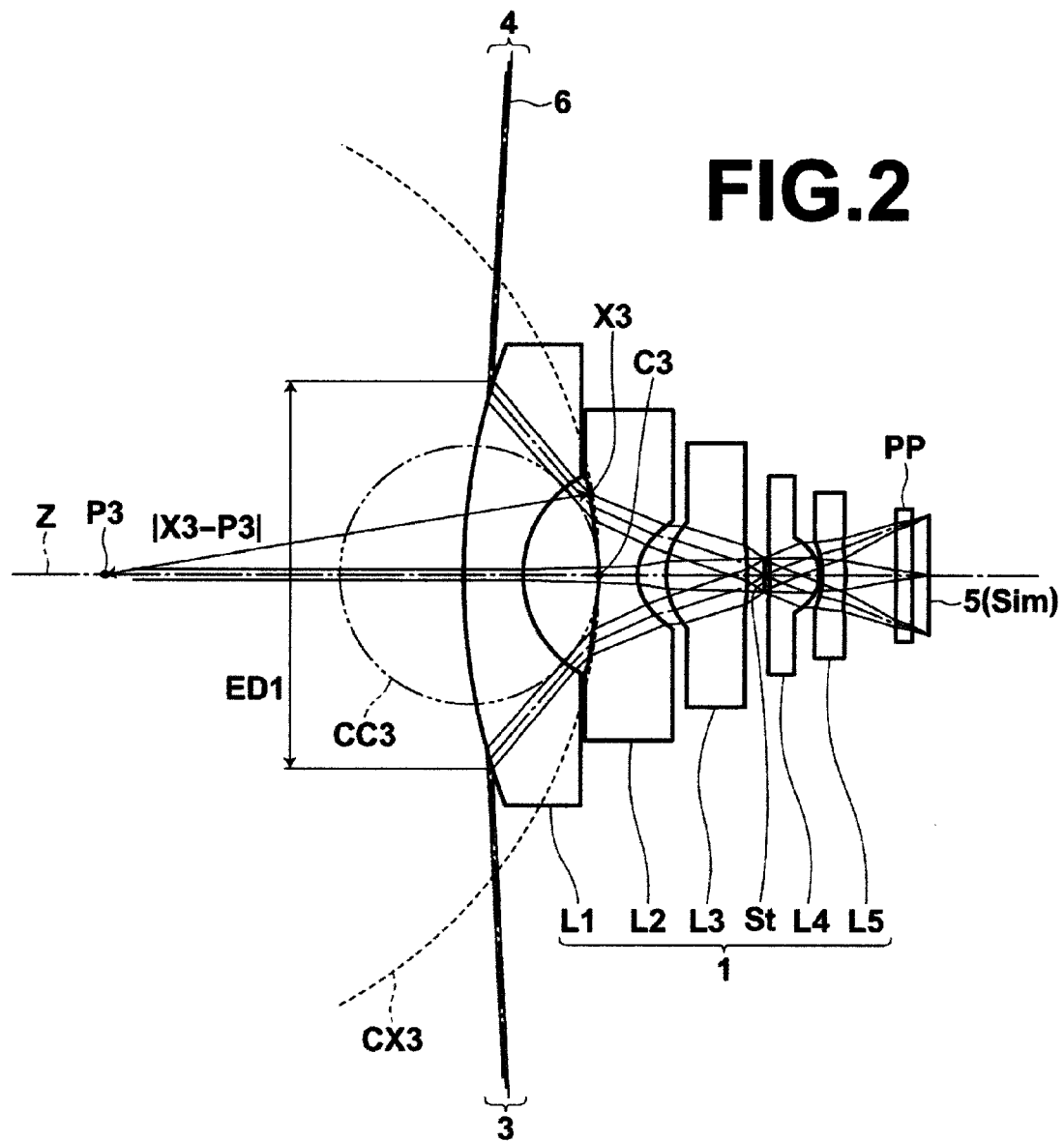
Figure 3:
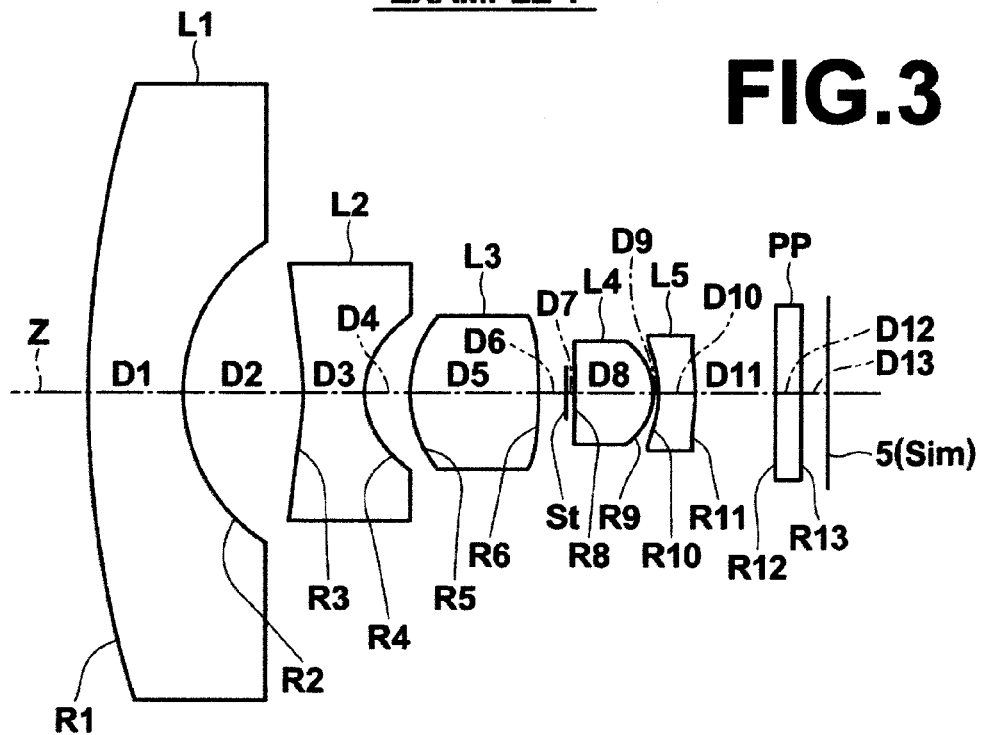
FIG. 3 is a cross-section illustrating the lens structure of an imaging lens according to Example 1 of the present invention.
Figure 4:
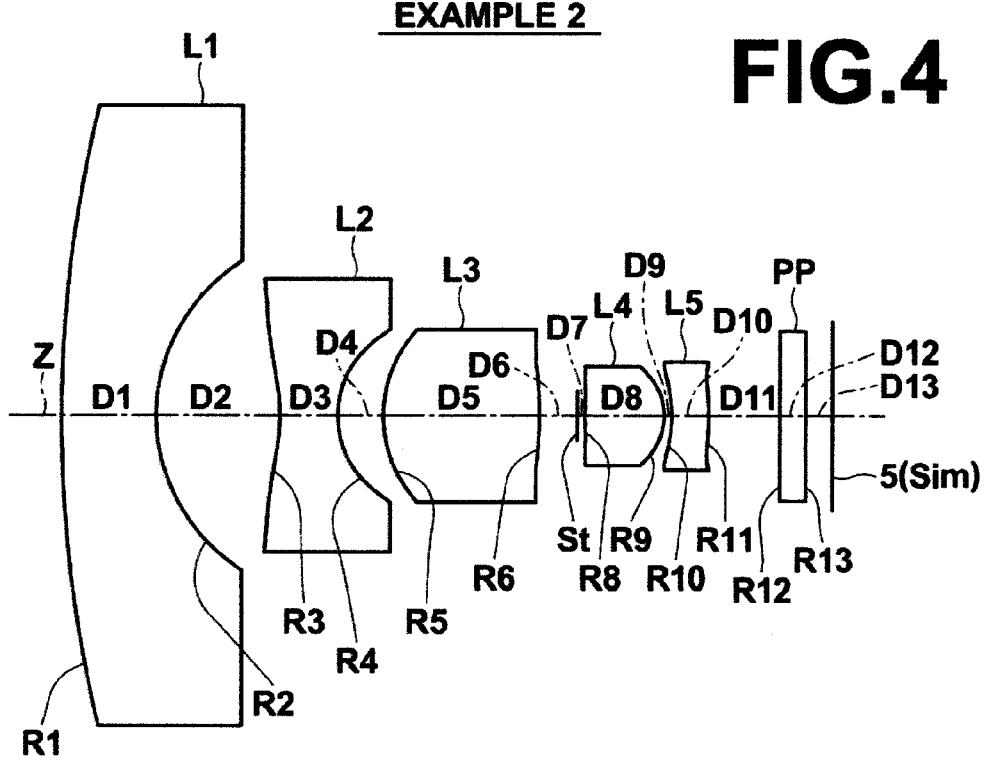
FIG. 4 is a cross-section illustrating the lens structure of an imaging lens according to Example 2 of the present invention.
Figure 9:
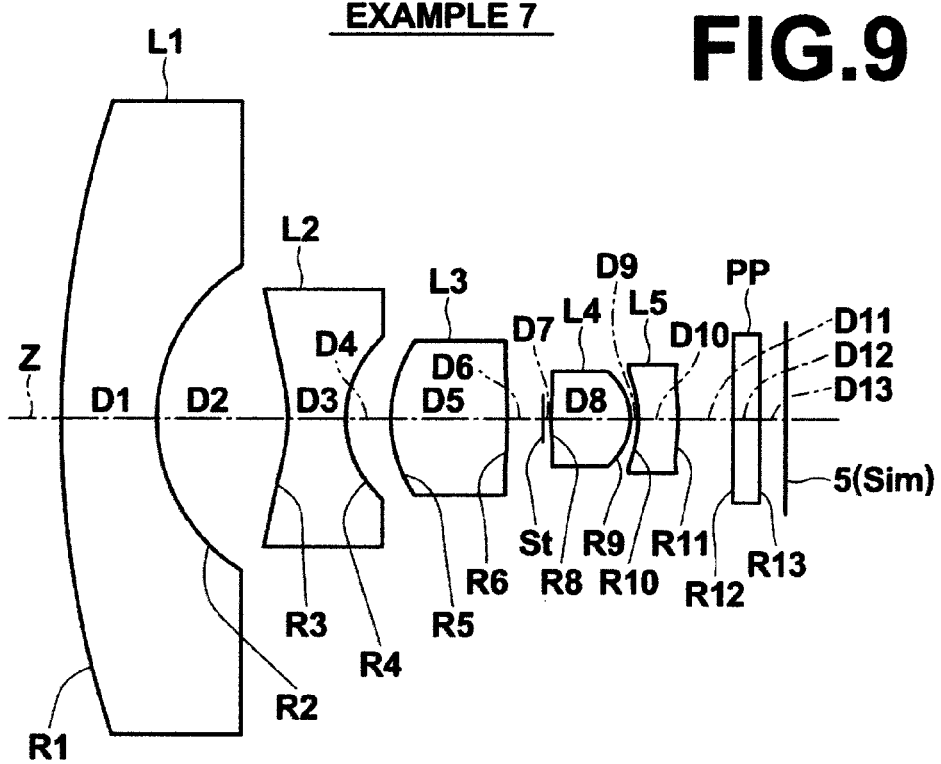
FIG. 9 is a cross-section illustrating the lens structure of an imaging lens according to Example 7 of the present invention.
Figure 10:
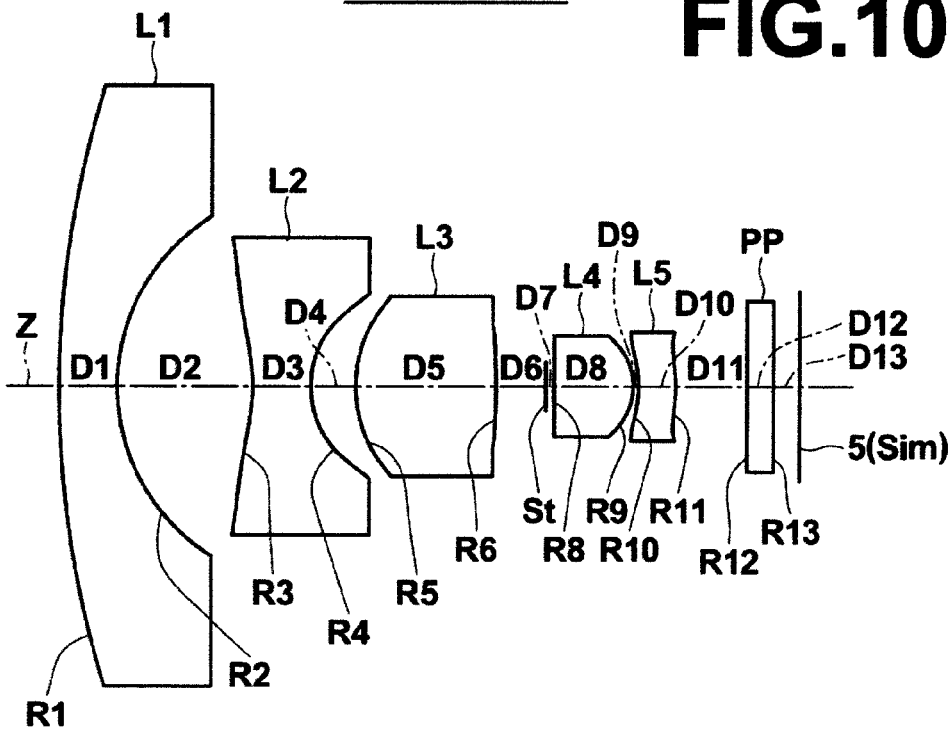
FIG. 10 is a cross-section illustrating the lens structure of an imaging lens according to Example 8 of the present invention.

Next, with reference to FIG. 2, the form of the object-side surface of the second lens L2 will be described. In FIG. 2, point C3 is the center of the object-side surface of the second lens L2. The point C3 is the intersection between the object-side surface of the second lens L2 and optical axis Z. In FIG. 2, point X3 is a point at the effective diameter edge of the object-side surface of the second lens L2. The point X3 is the intersection between an outermost ray 6 included in the off-axial beam 4 and the object-side surface of the second lens L2.

At this time, as illustrated in FIG. 2, the intersection between the normal to the lens surface at point X3 and the optical axis Z is defined as point P3, and the segment X3–P3, which connects the point X3 and the point P3, is defined as the curvature radius, and the length |X3–P3| of the segment X3–P3 is defined as the absolute value of the curvature radius at the point X3. Further, the curvature radius at the point C3, in other words, the curvature radius at the center of the object-side surface of the second lens L2 is defined as R3, and the absolute value of the curvature radius is defined as |R3| (not illustrated in FIG. 2).

The expression "the object-side surface of the second lens L2 has a negative power at the center thereof (the curvature radius at the center is negative), and negative power at the effective diameter edge is weaker than the negative power at the center thereof" means that the object-side surface of the second lens L2 is concave in the paraxial region including the point C3, and that the point P3 is located on the object-side of the point C3, and that |X3−P3|>|R3| is satisfied.

In FIG. 2, circle CC3 is illustrated by a double dot dash line, and a part of circle CX3 is illustrated by a broken line to facilitate understanding. The circle CC3 has radius |R3|, and passes through the point C3, and the center of which is located on the optical axis. The circle CX3 has radius |X3−P3|, and passes through the point X3, and the center of which is located on the optical axis. FIG. 2 clearly illustrates that the circle CX3 is larger than the circle CC3, and that |X3−P3|>|R3| is satisfied.

When the focal length of the entire system is f, it is desirable that |X3−P3| is in the range satisfying 10<|X3−P3|/f<20. When the value is set within the range, it is possible to reduce the negative power at the effective diameter edge. Hence, it is possible to correct field curvature in an excellent manner as well as increasing the angle of view.

It is desirable that the image-side surface of the second lens L2 is aspheric. Further, it is desirable that the image-side surface of the second lens L2 has a negative power at the center thereof (the curvature radius at the center is positive), and negative power at the effective diameter edge is weaker than the negative power at the center thereof. When the image-side surface of the second lens L2 is formed in such a manner, it is possible to condense light without sharply refracting peripheral rays. Hence, it is possible to correct distortion in an excellent manner.

The form of the image-side surface of the second lens L2 may be considered in a similar manner to the form of the object-side surface of the second lens L2, which was described with reference to FIG. 2. When the effective diameter edge of the image-side surface of the second lens L2 is point X4 in the cross-section of the lens, and the intersection between the normal to the image-side surface of the second lens L2 at the point X4 and the optical axis Z is point P4, segment X4−P4, which connects the point X4 and the point P4, is defined as curvature radius at the point X4, and the length |X4−P4| of the segment X4−P4 is defined as the absolute value of the curvature radius at the point X4. Further, the intersection between the image-side surface of the second lens L2 and the optical axis Z, in other words, the center of the image-side surface of the second lens L2 is defined as point C4. Further, the absolute value of the curvature radius at the point C4 is defined as |R4|.

The expression "the image-side surface of the second lens L2 has a negative power at the center thereof (the curvature radius at the center is positive), and negative power at the effective diameter edge is weaker than the negative power at the center thereof" means that the paraxial region including the point C4 is concave, and that the point P4 is located on the image side of the point C4, and |X4−P4|>|R4| is satisfied.

When the focal length of the entire system is f, it is desirable that the value |X4−P4| satisfies 1.8<|X4−P4|/f<3.5. When the value |X4−P4| is set in this range, it is possible to limit the incident angle of rays in the peripheral area entering the image-side surface of the lens L2 to an appropriate range. Further, it is possible to easily increase the angle of view, and to correct distortion in an excellent manner.

It is desirable that the third lens L3 is double convex in the paraxial region. When the third lens L3 is formed in such a manner, it is possible to increase the positive power of the third lens L3. When the positive power of the third lens L3 is increased, it is possible to easily correct lateral chromatic aberration.

Further, it is desirable that the object-side surface of the third lens L3 is aspheric. It is desirable that the object-side surface of the third lens L3 has a positive power at the center thereof (the curvature radius at the center is positive), and positive power at the effective diameter edge is weaker than the positive power at the center. When the object-side surface of the third lens L3 is formed in such a manner, it is possible to correct field curvature in an excellent manner.

The form of the object-side surface of the third lens L3 may be considered in a similar manner to the form of the object-side surface of the second lens L2, which was described with reference to FIG. 2. When the effective diameter edge of the object-side surface of the third lens L3 is point X5 in the cross-section of the lens, and the intersection between the normal to the object-side surface of the third lens L3 at the point X5 and the optical axis Z is point P5, segment X5−P5, which connects the point X5 and the point P5, is defined as curvature radius at the point X5, and the length |X5−P5| of the segment X5−P5 is defined as the absolute value of the curvature radius at the point X5. Further, the intersection between the object-side surface of the third lens L3 and the optical axis Z, in other words, the center of the object-side surface of the third lens L3 is defined as point C5. Further, the absolute value of the curvature radius at the point C5 is defined as |R5|.

The expression "the object-side surface of the third lens L3 has a positive power at the center thereof (the curvature radius at the center is positive), and positive power at the effective diameter edge is weaker than the positive power at the center thereof" means that the paraxial region including the point C5 is convex, and that the point P5 is located on the image side of the point C5, and |X5−P5|>|R5| is satisfied.

When the focal length of the entire system is f, it is desirable that the value |X5−P5| satisfies 2<|X5−P5|/f<7. When the value |X5−P5| is set in this range, it is possible to reduce the positive power at the effective diameter edge. Further, it is possible to correct field curvature in an excellent manner.

It is desirable that the image-side surface of the third lens L3 is aspheric. Further, it is desirable that the image-side surface of the third lens L3 has a positive power at the center thereof (the curvature radius at the center is negative), and positive power at the effective diameter edge is higher than the positive power at the center. When the image-side surface of the third lens L3 is formed in such a manner, it is possible to correct spherical aberration and field curvature in an excellent manner.

The form of the image-side surface of the third lens L3 may be considered in a similar manner to the form of the object-side surface of the second lens L2, which was described with reference to FIG. 2. When the effective diameter edge of the image-side surface of the third lens L3 is point X6 in the cross-section of the lens, and the intersection between the normal to the image-side surface of the third lens L3 at the point X6 and the optical axis Z is point P6, segment X6−P6, which connects the point X6 and the point P6, is defined as curvature radius at the point X6, and the length |X6−P6| of the segment X6−P6 is defined as the absolute value of the curvature radius at the point X6. Further, the intersection between the image-side surface of the third lens L3 and the optical axis Z, in other words, the center of the image-side surface of the third lens L3 is defined as point C6. Further, the absolute value of the curvature radius at the point C6 is defined as |R6|.

The expression "the image-side surface of the third lens L3 has a positive power at the center thereof (the curvature radius at the center is negative), and positive power at the effective diameter edge is higher than the positive power at the center thereof" means that the paraxial region including the point C6 is convex, and that the point P6 is located on the object side of the point C6, and |X6−P6|<|R6| is satisfied.

When the focal length of the entire system is f, it is desirable that the value |X6−P6| satisfies 4<|X6−P6|/f<12. When the value |X6−P6| is set in this range, it is possible to increase the positive power at the effective diameter edge. Further, it is possible to correct spherical aberration and field curvature in an excellent manner.

It is desirable that the fourth lens L4 is double convex in the paraxial region. When the fourth lens L4 is formed in such a manner, it is possible to increase the positive power of the fourth lens L4. When the positive power of the fourth lens L4 increases, it is possible to limit the incident angle of the peripheral rays entering the image plane Sim to small degrees. Further, it is possible to easily correct longitudinal chromatic aberration in combination with the fifth lens L5.

It is desirable that the object-side surface of the fourth lens L4 is aspheric. Further, it is desirable that the object-side surface of the fourth lens L4 has a positive power at the center thereof (the curvature radius at the center is positive), and positive power at the effective diameter edge is weaker than the positive power at the center. Alternatively, it is desirable that the object-side surface of the fourth lens L4 has a positive power at the center thereof, and a negative power at the effective diameter edge. When the object-side surface of the fourth lens L4 is formed in such a manner, it is possible to correct spherical aberration in an excellent manner.

The form of the object-side surface of the fourth lens L4 may be considered in a similar manner to the form of the object-side surface of the second lens L2, which was described with reference to FIG. 2. When the effective diameter edge of the object-side surface of the fourth lens L4 is point X8 in the cross-section of the lens, and the intersection between the normal to the object-side surface of the fourth lens L4 at the point X8 and the optical axis z is point P8, segment X8−P8, which connects the point X8 and the point P8, is defined as curvature radius at the point X8, and the length |X8−P8| of the segment X8−P8 is defined as the absolute value of the curvature radius at the point X8. Further, the intersection between the object-side surface of the fourth lens L4 and the optical axis Z, in other words, the center of the object-side surface of the fourth lens L4 is defined as point C8. Further, the absolute value of the curvature radius at the point C8 is defined as |R8|.

The expression "the object-side surface of the fourth lens L4 has a positive power at the center thereof (the curvature radius at the center is positive), and positive power at the effective diameter edge is weaker than the positive power at the center thereof" means that the paraxial region including the point C8 is convex, and that the point P8 is located on the image side of the point C8, and |X8−P8|>|R8| is satisfied. The expression "the object-side surface of the fourth lens L4 has a positive power at the center thereof, and a negative power at the effective diameter edge" means that the paraxial region including the point C8 is convex, and that the point P8 is located on the object side of the point C8.

When the focal length of the entire system is f, it is desirable that the value |X8−P8| satisfies 5<|X8−P8|/f<50. When the value |X8−P8| is set in this range, it is possible to reduce the positive power at the effective diameter edge. Further, it is possible to correct spherical aberration in an excellent manner.

It is desirable that the image-side surface of the fourth lens L4 is aspheric. Further, it is desirable that the image-side surface of the fourth lens L4 has a positive power at the center thereof (the curvature radius at the center is negative), and positive power at the effective diameter edge is weaker than the positive power at the center. When the image-side surface of the fourth lens L4 is formed in such a manner, it is possible to correct field curvature and spherical aberration in an excellent manner.

The form of the image-side surface of the fourth lens L4 may be considered in a similar manner to the form of the object-side surface of the second lens L2, which was described with reference to FIG. 2. When the effective diameter edge of the image-side surface of the fourth lens L4 is point X9 in the cross-section of the lens, and the intersection between the normal to the object-side surface of the fourth lens L4 at the point X9 and the optical axis Z is point P9, segment X9−P9, which connects the point X9 and the point P9, is defined as curvature radius at the point X9, and the length |X9−P9| of the segment X9−P9 is defined as the absolute value of the curvature radius at the point X9. Further, the intersection between the image-side surface of the fourth lens L4 and the optical axis Z, in other words, the center of the image-side surface of the fourth lens L4 is defined as point C9. Further, the absolute value of the curvature radius at the point C9 is defined as |R9|.

The expression "the image-side surface of the fourth lens L4 has a positive power at the center thereof (the curvature radius at the center is negative), and positive power at the effective diameter edge is weaker than the positive power at the center thereof" means that the paraxial region including the point C9 is convex, and that the point P9 is located on the object side of the point C9, and |X9−P9|>|R9| is satisfied.

When the focal length of the entire system is f, it is desirable that the value |X9−P9| satisfies 1.2<|X9−P9|/f<1.8. When the value |X9−P9| is set in this range, it is possible to reduce the positive power at the effective diameter edge. Further, it is possible to correct spherical aberration in an excellent manner.

It is desirable that the fifth lens L5 is a negative meniscus lens having a concave surface facing the object side. When the fifth lens L5 is formed in such a manner, it is possible to correct longitudinal chromatic aberration and coma aberration in an excellent manner.

It is desirable that the object-side surface of the fifth lens L5 is aspheric. Further, it is desirable that the object-side surface of the fifth lens L5 has a negative power at the center thereof (the curvature radius at the center is negative), and negative power at the effective diameter edge is weaker than the negative power at the center. When the object-side surface of the fifth lens L5 is formed in such a manner, it is possible to correct field curvature in an excellent manner.

The form of the object-side surface of the fifth lens L5 may be considered in a similar manner to the form of the object-side surface of the second lens L2, which was described with reference to FIG. 2. When the effective diameter edge of the object-side surface of the fifth lens L5 is point X10 in the cross-section of the lens, and the intersection between the normal to the object-side surface of the fifth lens L5 at the point X10 and the optical axis Z is point P10, segment X10−P10, which connects the point X10 and the point P10, is defined as curvature radius at the point X10, and the length |X10−P10| of the segment X10−P10 is defined as the absolute value of the curvature radius at the point X10. Further, the intersection between the object-side surface of the fifth lens L5 and the optical axis Z, in other words, the center of the object-side surface of the fifth lens L5 is defined as point C10. Further, the absolute value of the curvature radius at the point C10 is defined as |R10|.

The expression "the object-side surface of the fifth lens L5 has a negative power at the center thereof (the curvature radius at the center is negative), and negative power at the effective diameter edge is weaker than the negative power at the center thereof" means that the paraxial region including the point C10 is concave, and that the point P10 is located on the object side of the point C10, and |X10−P10|>|R10| is satisfied.

When the focal length of the entire system is f, it is desirable that the value |X10−P10| satisfies 3.0<|X10−P10|/f. When the value |X10−P10| is set in this range, it is possible to reduce the negative power at the effective diameter edge. Further, it is possible to correct spherical aberration in an excellent manner.

It is desirable that the image-side surface of the fifth lens L5 is aspheric. Further, it is desirable that the image-side surface of the fifth lens L5 has a positive power at the center thereof (the curvature radius at the center is negative), and positive power at the effective diameter edge is weaker than the positive power at the center. When the image-side surface of the fifth lens L5 is formed in such a manner, it is possible to correct spherical aberration, field curvature, and coma aberration in an excellent manner.

The form of the image-side surface of the fifth lens L5 may be considered in a similar manner to the form of the object-side surface of the second lens L2, which was described with reference to FIG. 2. When the effective diameter edge of the image-side surface of the fifth lens L5 is point X11 in the cross-section of the lens, and the intersection between the normal to the image-side surface of the fifth lens L5 at the point X11 and the optical axis Z is point P11, segment X11−P11, which connects the point X11 and the point P11, is defined as curvature radius at the point X11, and the length |X11−P11| of the segment X11−P11 is defined as the absolute value of the curvature radius at the point X11. Further, the intersection between the image-side surface of the fifth lens L5 and the optical axis Z, in other words, the center of the image-side surface of the fifth lens L5 is defined as point C11. Further, the absolute value of the curvature radius at the point C11 is defined as |R11|.

The expression "the image-side surface of the fifth lens L5 has a positive power at the center thereof (the curvature radius at the center is negative), and positive power at the effective diameter edge is weaker than the positive power at the center thereof" means that the paraxial region including the point C11 is convex, and that the point P11 is located on the object side of the point C11, and |X11−P11|>|R11| is satisfied.

When the focal length of the entire system is f, it is desirable that the value |X11−P11| satisfies 2<|X11−P11|/f<12. When the value |X11−P11| is set in this range, it is possible to reduce the positive power at the effective diameter edge. Further, it is possible to correct spherical aberration, field curvature, and coma aberration in an excellent manner.

When each surface of the object-side surface of the second lens L2 through the image-side surface of the fifth lens L5 is aspheric as described above, it is possible to correct distortion in an excellent manner in addition to spherical aberration, field curvature and coma aberration.

In the imaging lens 1 illustrated in FIG. 1, each of the first lens L1 through the fifth lens L5 is a single lens. When use of the imaging lens in tough conditions, such as in-vehicle use, is expected, it is desirable that no cemented lens is included in the imaging lens 1. If no cemented lens is included in the imaging lens 1, it is possible to produce the imaging lens 1 at low cost.

It is desirable that the Abbe number of the material of the first lens L1 for d-line is greater than or equal to 40. When the first lens L1 is made of such material, it is possible to suppress chromatic aberrations, and to obtain excellent resolution. Further, it is more desirable that the Abbe number of the material of the first lens L1 for d-line is greater than or equal to 45. When the first lens L1 is made of such material, it is possible to easily suppress chromatic aberrations, and to easily obtain excellent resolution. Further, it is even more desirable that the Abbe number of the material of the first lens L1 for d-line is greater than or equal to 47. When the first lens L1 is made of such material, it is possible to more easily suppress chromatic aberrations, and to more easily obtain excellent resolution.

It is desirable that the Abbe number of the material of the second lens L2 for d-line is greater than or equal to 40. When the second lens L2 is made of such material, it is possible to suppress chromatic aberrations, and to obtain excellent resolution. Further, it is more desirable that the Abbe number of the material of the second lens L2 for d-line is greater than or equal to 45. When the second lens L2 is made of such material, it is possible to easily suppress chromatic aberrations, and to easily obtain excellent resolution. Further, it is even more desirable that the Abbe number of the material of the second lens L2 for d-line is greater than or equal to 50. When the second lens L2 is made of such material, it is possible to more easily suppress chromatic aberrations, and to more easily obtain excellent resolution.

It is desirable that the Abbe number of the material of the fourth lens L4 for d-line is greater than or equal to 40. When the fourth lens L4 is made of such material, it is possible to suppress chromatic aberrations, and to obtain excellent resolution. Further, it is more desirable that the Abbe number of the material of the fourth lens L4 for d-line is greater than or equal to 45. When the fourth lens L4 is made of such material, it is possible to easily suppress chromatic aberrations, and to easily obtain excellent resolution. Further, it is even more desirable that the Abbe number of the material of the fourth lens L4 for d-line is greater than or equal to 50. When the fourth lens L4 is made of such material, it is possible to more easily suppress chromatic aberrations, and to more easily obtain excellent resolution.

It is desirable that the Abbe number of the material of the third lens L3 for d-line is less than or equal to 30. When the third lens L3 is made of such material, it is possible to correct lateral chromatic aberration in an excellent manner. Further, it is more desirable that the Abbe number of the material of the third lens L3 for d-line is less than or equal to 28. When the third lens L3 is made of such material, it is possible to correct lateral chromatic aberration in a more excellent manner. Further, it is even more desirable that the Abbe number of the material of the third lens L3 for d-line is less than or equal to 26. When the third lens L3 is made of such material, it is possible to correct lateral chromatic aberration in an even more excellent manner. Further, it is even more desirable that the Abbe number of the material of the third lens L3 for d-line is less than or equal to 25. When the third lens L3 is made of such material, it is possible to correct lateral chromatic aberration in a still more excellent manner.

It is desirable that the Abbe number of the material of the fifth lens L5 for d-line is less than or equal to 30. When the fifth lens L5 is made of such material; it is possible to correct longitudinal chromatic aberration in an excellent manner. Further, it is more desirable that the Abbe, number of the material of the fifth lens L5 for d-line is less than or equal to 28. When the fifth lens L5 is made of such material, it is possible to correct longitudinal chromatic aberration in a more excellent manner. Further, it is even more desirable that the Abbe number of the material of the fifth lens L5 for d-line is less than or equal to 26. When the fifth lens L5 is made of such material, it is possible to correct longitudinal chromatic aberration in an even more excellent manner. Further, it is even more desirable that the Abbe number of the material of the fifth lens L5 for d-line is less than or equal to 25. When the fifth lens L5 is made of such material, it is possible to correct longitudinal chromatic aberration in a still more excellent manner.

It is desirable that the first lens L1 of the imaging lens of the present embodiment is made of glass, and that the second lens L2, the third lens L3, the fourth lens L4, and the fifth lens L5 are made of plastic.

When the imaging lens is used in rough conditions, for example, as a lens of an in-vehicle camera, a monitor camera, or the like, the material of the first lens L1, which is arranged on the most object side, needs to be resistant to wind and rain, which damages the lens surface, and a change in temperature by direct sunlight. Further, the material needs to be resistant to chemicals, such as oil and fat, and detergent, in other words, the material needs to have high water-resistance, weather-resistance, acid-resistance, chemical-resistance, and the like. Further, the material needs to be hard and not easily breakable. When glass is used as the material of the lens, it is possible to achieve these requirements for the lens. Alternatively, a transparent ceramic may be used as the material of the first lens L1.

Further, a protection means may be provided on the object-side surface of the first lens L1 to improve the strength, anti-scratch characteristic, and chemical resistance of the lens. In that case, the material of the first lens L1 may be plastic. The protection means may be a hard coating, or a water-repellent coating.

When the materials of the second lens L2, the third lens L3, the fourth lens L4, and the fifth lens L5 are plastic, it is possible to produce the lens system at low cost and to reduce the weight of the lens system. Further, since it is possible to accurately form the aspheric form by using plastic, it is possible to produce a lens that has an excellent performance.

When at least one of the second lens L2, the third lens L3, the fourth lens L4, and the fifth lens L5 is made of plastic, a so-called nano-composite material may be used as the material of the lens. The nano-composite material is obtained by mixing particles, the diameter of which is less than the wavelength of light, into plastic.

Further, depending on the usage of the imaging lens 1, a filter that cuts rays of ultraviolet rays to blue rays, or an IR (InfraRed) filter that cuts infrared rays may be inserted between the lens system and the imaging device 5. Alternatively, a coating that has properties similar to these filters may be applied to the lens surface.

FIG. 1 illustrates an example in which optical member PP, which is assumed to be various filters, is arranged between the lens system and the imaging device 5. Alternatively, these various filters may be arranged between the lenses. Further, a coating that acts in a manner similar to the various filters may be applied to a lens surface of one of the lenses included in the imaging lens.

Further, a ray of light that passes an area on the outside of the effective diameter between lenses may become stray light, and reach image plane, thereby causing a ghost (image). Therefore, it is desirable that a light cutting means, which cuts the stray light, is provided, if necessary. The light cutting means may be provided, for example, by applying an opaque paint to a portion of the lens on the outside of the effective diameter. Alternatively, an opaque plate may be set at the portion of the lens on the outside of the effective diameter. Alternatively, the light cutting means may be provided by setting an opaque plate in the optical path of the ray of light that becomes stray light. Alternatively, a hood that cuts stray light may be provided further on the object side of the most object side lens.

As an example, FIG. 1 illustrates a case in which light cutting means 11 and 12 are set on the image-side surface of the first lens L1 and the image-side surface of the second lens L2, respectively. The light cutting means 11 and 12 are set on the outsides of the effective diameters of the first lens L1 and the second lens L2, respectively. The position for setting the light cutting means is not limited to the example illustrated in FIG. 1. The light cutting means may be set on another or other lenses, or between lenses.

Further, a member, such as an aperture stop, may be provided between lenses to cut peripheral rays in such a manner that the relative illumination remains practically acceptable. The peripheral rays are rays traveling from object points on the outside of the optical axis Z, and pass the peripheral area of the entrance pupil of the optical system. When a member that cuts the peripheral rays is provided as described above, it is possible to improve the image quality of the image peripheral area. Further, since the member cuts light that causes a ghost, it is possible to reduce the ghost.

Next, examples of numerical values of the imaging lens of the present invention will be described. FIGS. 3 through 10 are cross-sections of the imaging lenses of Examples 1 through 8, respectively. In each of FIGS. 3 through 10, the left side of the diagram is the object side, and the right side of the diagram is the image side. In a manner similar to FIG. 1, aperture stop St, optical member PP, and an imaging device 5 that is arranged on image plane Sim are also illustrated. In each of the diagrams, the aperture stop St represents neither the form nor the size of the aperture stop St, but represents the position of the aperture stop St on the optical axis Z. In each of the examples, signs Ri, Di(i=1, 2, 3, . . . ) in the cross-sections correspond to Ri, Di in lens data, which will be described below.

Table 1 shows lens data and various data about the imaging lens of Example 1. Table 2 shows aspheric surface data about the imaging lens of Example 1. Table 3 shows data about curvature of radius at an effective diameter edge. Similarly, Tables 4 through 24 show lens data, various data, aspheric surface data, and data about curvature of radius at an effective diameter edge for the imaging lenses of Examples 2 through 8. The meanings of the signs in the tables will be described by using Example 1. The meanings of the signs are basically the same in Examples 2 through 8.

In the lens data of Table 1, column Si shows the surface number of i-th surface (i=1, 2, 3, . . . ). The surface number of the object-side surface of the most object side element is 1, and surface numbers sequentially increase toward the image side. Column Ri shows the curvature radius of the i-th surface, and column Di shows an interval between i-th surface and (i+1)th surface on optical axis Z. Here, the sign of the curvature radius is positive when a surface facing the object side is convex, and the sign of the curvature radius is negative when a surface facing the image side is convex.

In the lens data of Table 1, column Ndj shows the refractive index of j-th optical element (j=1, 2, 3, . . . ) for d-line (wavelength is 587.6 nm). The number of the most object side lens is 1, and numbers sequentially increase toward the image side. Column vdj shows the Abbe number of the j-th optical element for d-line. The lens data include aperture stop St and optical member PP. In the column Ri of curvature radius, the term "(APERTURE STOP)" is written for the surface corresponding to aperture stop St.

In various data shown in Table 1, Fno. represents F-number. 2ω represents full angle of view. Bf represents a distance from the image-side surface of the most image side lens to the image plane on optical axis Z (corresponding to backfocus, air converted length). L represents a distance from the object-side surface of the first lens L1 to image plane Sim on optical axis Z (backfocus portion is air converted length). ED1 represents the effective diameter of the object-side surface of the first lens L1. Further, f represents the focal length of the entire system, and f1 represents the focal length of the first lens L1, and f2 represents the focal length of the second lens L2, and f3 represents the focal length of the third lens L3, and f4 represents the focal length of the fourth lens L4, and f5 represents the focal length of the fifth lens L5. Further, f12 represents the combined focal length of the first lens L1 and the second lens L2, f45 represents the combined focal length of the fourth lens L4 and the fifth lens L5. Further, f123 represents the combined focal length of the first lens L1, the second lens L2 and the third lens L3.

In the lens data of Table 1, mark "*" is attached to the surface number of an aspheric surface. Table 1 shows, as the curvature radius of an aspheric surface, the numerical value of the curvature radius (paraxial curvature radius) in the paraxial region (vicinity) of the optical axis. The aspheric data in Table 2 show surface numbers of aspheric surfaces and aspheric coefficients for the aspheric surfaces. In the aspheric data of Table 2, the numerical value "E-n" (n: integer) represents "×10$^{-n}$", and "E+n" represents "×10$^{n}$". Further, the aspheric coefficients are coefficients KA, RBm (m=3, 4, 5, . . . 20) in the following formula of aspheric surface:

$$Zd = \frac{C \times Y^2}{1 + \sqrt{1 - KA \times C^2 \times Y^2}} + \sum_{m} RB_m \times Y^m \quad \text{[Formula 1]}$$

where

Zd: depth of aspheric surface (length of a perpendicular from a point at height Y on an aspheric surface to a flat plane that is perpendicular to an optical axis, the flat plane contacting with the vertex of the aspheric surface), Y: height (distance from the optical axis to the lens surface), C: inverse number of paraxial curvature radius, KA, RE$_m$: aspheric coefficients (m=3, 4, 5, . . . 20). In the data about the curvature radius at the effective diameter edge in Table 3, the aforementioned signs are used to represent surface numbers, absolute values of curvature radii at effective diameter edges, and ratios of the absolute values of curvature radii at effective diameter edges to the focal length of the entire system.

In each table, values are rounded to predetermined digits. The unit of angle is "°" (degree), and the unit of length is "mm". However, these units are only examples. Optical systems can achieve similar optical performance when they are proportionally enlarged or proportionally reduced. Therefore, other appropriate units may be used.

TABLE 1

| EXAMPLE 1 LENS DATA | | | | |
|---|---|---|---|---|
| Si | Ri | Di | Ndj | νdj |
| 1 | 19.8727 | 1.7979 | 1.7725 | 49.6 |
| 2 | 3.3985 | 2.2808 | | |
| 3* | −3.8953 | 1.1652 | 1.5316 | 55.4 |
| 4* | 1.3670 | 0.8680 | | |
| 5* | 2.2000 | 2.4357 | 1.6139 | 25.5 |
| 6* | −12.8278 | 0.5248 | | |
| 7 | (APERTURE STOP) | 0.1500 | | |
| 8* | 8.6933 | 1.5001 | 1.5316 | 55.4 |
| 9* | −1.2570 | 0.1000 | | |
| 10* | −2.5270 | 0.7000 | 1.6139 | 25.5 |
| 11* | −3.1130 | 0.5000 | | |
| 12 | ∞ | 0.5000 | 1.5231 | 54.5 |
| 13 | ∞ | 1.5155 | | |
| IMAGE PLANE | ∞ | | | |

| EXAMPLE 1 VARIOUS DATA | |
|---|---|
| Fno. | 2.8 |
| 2ω | 186.0 |
| L | 13.87 |
| ED1 | 11.74 |
| f | 0.88 |
| f5 | −40.08 |
| f12 | −0.99 |
| f45 | 2.52 |
| f123 | −6.22 |

TABLE 2

| EXAMPLE 1 ASPHERIC SURFACE DATA | | | | | |
|---|---|---|---|---|---|
| SURFACE NUMBER | KA | RB3 | RB4 | RB5 | RB6 |
| 3 | 0.0000000E+00 | 3.6291771E−02 | 5.0612999E−03 | −1.0705137E−03 | −4.7220214E−04 |
| 4 | 0.0000000E+00 | −1.3274093E−02 | 3.3138411E−03 | −1.5912992E−02 | 1.8506112E−02 |
| 5 | 0.0000000E+00 | 5.0848676E−03 | −2.8067141E−02 | 2.0253635E−02 | 3.9596966E−03 |
| 6 | 0.0000000E+00 | −3.1674621E−02 | 7.5462426E−02 | −8.0303941E−02 | 1.9344612E−03 |
| 8 | 0.0000000E+00 | 3.5070754E−02 | 1.5367486E−02 | −2.7524489E+00 | 8.4189364E+00 |
| 9 | 0.0000000E+00 | −5.1412694E−02 | −1.2605686E−01 | 1.1450597E−01 | −1.0582157E−01 |
| 10 | 0.0000000E+00 | −5.5128879E−02 | 1.4978312E−02 | 1.2731194E−02 | 9.4298238E−03 |
| 11 | 0.0000000E+00 | 2.7518242E−02 | 5.7419401E−02 | 1.5295997E−02 | 2.7470838E−03 |

| SURFACE NUMBER | RB7 | RB8 | RB9 | RB10 | RB11 |
|---|---|---|---|---|---|
| 3 | −7.6766618E−05 | 4.0035856E−06 | 2.6402897E−06 | 6.0911749E−07 | 6.3242560E−08 |
| 4 | 8.4353300E−03 | 1.2361532E−03 | −9.2388663E−04 | −9.6886902E−04 | −5.8760245E−04 |
| 5 | 3.1298752E−03 | 3.3119886E−04 | −2.2052173E−03 | −1.2721400E−03 | 4.9439680E−04 |
| 6 | 2.9243138E−02 | 1.8700958E−03 | −2.3584297E−02 | −1.6105682E−02 | 1.9936702E−02 |
| 8 | −2.9484039E+00 | −1.4640163E+01 | −1.4160826E+01 | 3.6815051E+01 | 7.5480097E+01 |
| 9 | −2.7053231E−03 | 3.1556112E−02 | 1.7482201E−02 | 1.7854989E−04 | −7.3236983E−03 |
| 10 | 9.0293100E−03 | 6.7136085E−03 | 1.7604332E−03 | −4.6780101E−03 | −2.0262504E−04 |
| 11 | −1.6407559E−03 | −3.3059983E−03 | −1.5526258E−03 | 1.2727605E−03 | 7.7579583E−05 |

| SURFACE NUMBER | RB12 | RB13 | RB14 | RB15 | RB16 |
|---|---|---|---|---|---|
| 3 | −4.1625993E−08 | −3.6368490E−10 | 3.7307606E−09 | 7.5110674E−10 | 6.8693827E−10 |
| 4 | −2.4332717E−04 | −9.6681447E−05 | −1.5878503E−05 | 1.3541568E−05 | 1.6125065E−05 |

TABLE 2-continued

EXAMPLE 1 ASPHERIC SURFACE DATA

| | | | | | |
|---|---|---|---|---|---|
| 5 | 2.6949484E−04 | 6.8441532E−05 | −3.7623941E−08 | −1.3135250E−05 | −1.2791580E−05 |
| 6 | 1.7679339E−02 | −1.9073052E−02 | −4.1740114E−03 | 1.0780472E−02 | −1.8419011E−03 |
| 8 | −4.2591256E+01 | −1.4233448E+02 | −5.7887540E+01 | 9.7179918E+01 | −1.0599932E+02 |
| 9 | −4.0742718E−03 | −5.9424963E−04 | 2.7058287E−06 | −1.6536855E−03 | −4.0902536E−03 |
| 10 | −1.3046534E−04 | −5.7447457E−05 | 8.7014453E−06 | 5.6643226E−05 | 0.0000000E+00 |
| 11 | 3.5705484E−05 | 1.9230382E−06 | −2.4088174E−05 | −4.3954222E−05 | 0.0000000E+00 |

| SURFACE NUMBER | RB17 | RB18 | RB19 | RB20 |
|---|---|---|---|---|
| 3 | 3.3120607E−11 | −6.1608877E−11 | −6.9583190E−11 | 1.1300642E−11 |
| 4 | 1.1568838E−05 | 6.9899461E−06 | −3.7899612E−07 | −1.5650438E−06 |
| 5 | −1.0362913E−05 | −6.5810333E−06 | −1.3998491E−06 | 3.1373198E−06 |
| 6 | −5.9243272E−04 | −3.3662313E−05 | −1.0192463E−03 | 5.1437177E−04 |
| 8 | 7.6863840E+02 | −1.0121787E+02 | −1.2982643E+03 | 8.0459518E+02 |
| 9 | −5.3755978E−03 | −4.0335556E−03 | 4.0552665E−03 | 7.4442965E−03 |
| 10 | 0.0000000E+00 | 0.0000000E+00 | 0.0000000E+00 | 0.0000000E+00 |
| 11 | 0.0000000E+00 | 0.0000000E+00 | 0.0000000E+00 | 0.0000000E+00 |

TABLE 3

EXAMPLE 1 DATA ABOUT CURVATURE RADIUS AT EFFECTIVE DIAMETER EDGE

| SURFACE NUMBER | ABSOLUTE VALUE | | RATIO OF ABSOLUTE VALUE TO FOCAL LENGTH | |
|---|---|---|---|---|
| 3 | \|X3 − P3\| | 14.83 | \|X3 − P3\|/f | 16.86 |
| 4 | \|X4 − P4\| | 1.90 | \|X4 − P4\|/f | 2.16 |
| 5 | \|X5 − P5\| | 2.40 | \|X5 − P5\|/f | 2.73 |
| 6 | \|X6 − P6\| | 6.90 | \|X6 − P6\|/f | 7.85 |
| 8 | \|X8 − P8\| | 5.55 | \|X8 − P8\|/f | 6.31 |
| 9 | \|X9 − P9\| | 1.23 | \|X9 − P9\|/f | 1.40 |
| 10 | \|X10 − P10\| | 3.42 | \|X10 − P10\|/f | 3.88 |
| 11 | \|X11 − P11\| | 9.36 | \|X11 − P11\|/f | 10.64 |

TABLE 4

EXAMPLE 2 LENS DATA

| Si | Ri | Di | Ndj | νdj |
|---|---|---|---|---|
| 1 | 25.1403 | 1.8000 | 1.7725 | 49.6 |
| 2 | 3.5076 | 2.3520 | | |
| 3* | −2.7034 | 1.1000 | 1.5316 | 55.4 |
| 4* | 2.1844 | 0.8644 | | |
| 5* | 2.6043 | 2.9553 | 1.6139 | 25.5 |
| 6* | −10.7426 | 0.7184 | | |
| 7 | (APERTURE STOP) | 0.1500 | | |
| 8* | 7.9390 | 1.5021 | 1.5316 | 55.4 |
| 9* | −1.2117 | 0.1500 | | |
| 10* | −2.4219 | 0.7005 | 1.6139 | 25.5 |
| 11* | −3.4288 | 0.8000 | | |
| 12 | ∞ | 0.5000 | 1.5231 | 54.5 |
| 13 | ∞ | 1.0469 | | |
| IMAGE PLANE | ∞ | | | |

EXAMPLE 2 VARIOUS DATA

| | |
|---|---|
| Fno. | 2.8 |
| 2ω | 185.8 |
| L | 14.47 |
| ED1 | 11.83 |
| f | 0.86 |
| f5 | −18.27 |
| f12 | −1.14 |
| f45 | 2.55 |
| f123 | −8.39 |

TABLE 5

EXAMPLE 2 ASPHERIC SURFACE DATA

| SURFACE NUMBER | KA | RB3 | RB4 | RB5 | RB6 |
|---|---|---|---|---|---|
| 3 | 0.0000000E+00 | 6.6637213E−02 | 3.1444829E−03 | −1.5996184E−03 | −5.5720640E−04 |
| 4 | 0.0000000E+00 | 4.2341314E−02 | 1.5981604E−02 | −2.6538982E−02 | 1.5188764E−02 |
| 5 | 0.0000000E+00 | 3.2280506E−02 | −4.3535131E−02 | 1.9540016E−02 | 4.8631850E−03 |
| 6 | 0.0000000E+00 | −1.7875753E−02 | 4.5156924E−02 | −6.6866844E−02 | 1.9104007E−02 |
| 8 | 0.0000000E+00 | −1.1527591E−02 | 2.9505348E−01 | −3.0918598E+00 | 7.9022786E+00 |
| 9 | 0.0000000E+00 | 4.1773420E−02 | −2.2186725E−01 | 1.3011338E−01 | −7.1116451E−02 |
| 10 | 0.0000000E+00 | 8.1488740E−03 | 1.8062520E−02 | −1.7369938E−02 | −3.4571640E−03 |
| 11 | 0.0000000E+00 | 2.6293187E−02 | 6.6675458E−02 | 3.9602341E−02 | 9.9475377E−05 |

| SURFACE NUMBER | RB7 | RB8 | RB9 | RB10 | RB11 |
|---|---|---|---|---|---|
| 3 | −6.8585376E−05 | 1.4832533E−05 | 6.7318760E−06 | 1.3211354E−06 | 6.2815047E−08 |
| 4 | 8.5196777E−03 | 1.8163652E−03 | −4.9882850E−04 | −7.2043992E−04 | −4.6918564E−04 |
| 5 | 3.8064793E−03 | 5.6270949E−04 | −2.2009830E−03 | −1.3316303E−03 | 4.3027605E−04 |
| 6 | 3.4220398E−02 | −1.2447645E−03 | −2.8382197E−03 | −1.9252401E−02 | 1.8881904E−02 |
| 8 | −2.1294474E+00 | −1.4392575E+01 | −1.3621755E+01 | 3.7232685E+01 | 7.4908443E+01 |
| 9 | 1.1626356E−02 | 2.5104465E−02 | 3.8868035E−03 | −9.5346591E−03 | −1.0101041E−02 |
| 10 | 2.3852778E−02 | 3.1624190E−02 | 1.5590038E−02 | −1.2178371E−02 | −4.4969522E−03 |
| 11 | −1.0337159E−02 | −6.9620325E−03 | 3.1173972E−03 | 1.4841162E−02 | 3.2569431E−03 |

TABLE 5-continued

EXAMPLE 2 ASPHERIC SURFACE DATA

| SURFACE NUMBER | RB12 | RB13 | RB14 | RB15 | RB16 |
|---|---|---|---|---|---|
| 3 | −1.1467764E−07 | −4.3475125E−08 | −8.8181534E−09 | −1.0353071E−09 | 1.3990862E−09 |
| 4 | −1.9326422E−04 | −8.0520030E−05 | −1.5096468E−05 | 7.2917521E−06 | 1.1142558E−05 |
| 5 | 2.3605706E−04 | 6.0862796E−05 | 3.7168832E−06 | −4.9383441E−06 | −5.0203544E−06 |
| 6 | 1.7919503E−02 | −1.8361655E−02 | −3.5383097E−03 | 1.1140756E−02 | −1.7362485E−03 |
| 8 | −4.4786539E+01 | −1.4690061E+02 | −6.2390251E+01 | 9.6253312E+01 | −9.5901510E+01 |
| 9 | −7.0640094E−05 | 6.7065454E−03 | 6.6763967E−03 | 1.8220524E−03 | −4.6564523E−03 |
| 10 | −5.6726627E−03 | 0.0000000E+00 | 0.0000000E+00 | 0.0000000E+00 | 0.0000000E+00 |
| 11 | −7.5099914E−03 | 0.0000000E+00 | 0.0000000E+00 | 0.0000000E+00 | 0.0000000E+00 |

| SURFACE NUMBER | RB17 | RB18 | RB19 | RB20 |
|---|---|---|---|---|
| 3 | 2.5371496E−10 | 1.2959286E−11 | −7.1886337E−11 | 1.6161015E−11 |
| 4 | 8.0186319E−06 | 5.0111901E−06 | −1.1973932E−06 | −8.3325830E−07 |
| 5 | −5.1131078E−06 | −4.1119327E−06 | −1.2158121E−06 | 1.7453833E−06 |
| 6 | −6.3651888E−04 | −1.4327853E−04 | −1.0930769E−03 | 5.1631308E−04 |
| 8 | 7.9619033E+02 | −5.3111962E+01 | −1.2732550E+03 | 6.4598517E+02 |
| 9 | −9.5491449E−03 | −8.9743186E−03 | −2.0125351E−03 | 1.3677293E−02 |
| 10 | 0.0000000E+00 | 0.0000000E+00 | 0.0000000E+00 | 0.0000000E+00 |
| 11 | 0.0000000E+00 | 0.0000000E+00 | 0.0000000E+00 | 0.0000000E+00 |

TABLE 6

EXAMPLE 2 DATA ABOUT CURVATURE RADIUS AT EFFECTIVE DIAMETER EDGE

| SURFACE NUMBER | ABSOLUTE VALUE | | RATIO OF ABSOLUTE VALUE TO FOCAL LENGTH | |
|---|---|---|---|---|
| 3 | |X3 − P3| | 25.82 | |X3 − P3|/f | 29.86 |
| 4 | |X4 − P4| | 2.12 | |X4 − P4|/f | 2.45 |
| 5 | |X5 − P5| | 2.72 | |X5 − P5|/f | 3.14 |
| 6 | |X6 − P6| | 6.52 | |X6 − P6|/f | 7.54 |
| 8 | |X8 − P8| | 8.46 | |X8 − P8|/f | 9.78 |
| 9 | |X9 − P9| | 1.28 | |X9 − P9|/f | 1.48 |
| 10 | |X10 − P10| | 7.97 | |X10 − P10|/f | 9.22 |
| 11 | |X11 − P11| | 3.45 | |X11 − P11|/f | 3.99 |

TABLE 7

EXAMPLE 3 LENS DATA

| Si | Ri | Di | Ndj | vdj |
|---|---|---|---|---|
| 1 | 24.5429 | 1.8000 | 1.7550 | 52.3 |
| 2 | 3.5451 | 2.4012 | | |
| 3* | −2.5849 | 1.1000 | 1.5339 | 56.0 |
| 4* | 2.3189 | 0.8500 | | |
| 5* | 2.8005 | 2.4655 | 1.6336 | 23.6 |
| 6* | −16.4376 | 0.9381 | | |
| 7 | (APERTURE STOP) | 0.1500 | | |
| 8* | 4.6240 | 1.5000 | 1.5339 | 56.0 |
| 9* | −1.1999 | 0.1500 | | |
| 10* | −2.0174 | 0.7476 | 1.6336 | 23.6 |
| 11* | −3.1566 | 0.5000 | | |
| 12 | ∞ | 0.5000 | 1.5231 | 54.5 |
| 13 | ∞ | 1.3642 | | |
| IMAGE PLANE | ∞ | | | |

EXAMPLE 3 VARIOUS DATA

| | |
|---|---|
| Fno. | 2.8 |
| 2ω | 182.6 |
| L | 14.29 |
| ED1 | 11.76 |
| f | 0.90 |
| f5 | −11.84 |
| f12 | −1.16 |
| f45 | 2.53 |
| f123 | −5.21 |

TABLE 8

EXAMPLE 3 ASPHERIC SURFACE DATA

| SURFACE NUMBER | KA | RB3 | RB4 | RB5 | RB6 |
|---|---|---|---|---|---|
| 3 | 0.0000000E+00 | 6.5479872E−02 | 2.7900217E−03 | −1.6619736E−03 | −5.6483388E−04 |
| 4 | 0.0000000E+00 | 2.8996806E−02 | 1.1442142E−02 | −2.8581706E−02 | 1.4137414E−02 |
| 5 | 0.0000000E+00 | 2.6999098E−02 | −4.6226420E−02 | 1.8348284E−02 | 4.4214648E−03 |
| 6 | 0.0000000E+00 | −1.3677234E−02 | 4.6006398E−02 | −6.7758668E−02 | 1.7520559E−02 |
| 8 | 0.0000000E+00 | −1.0609471E−02 | 3.0941305E−01 | −3.0754451E+00 | 7.9130631E+00 |
| 9 | 0.0000000E+00 | 3.5955970E−02 | −2.1974544E−01 | 1.3210870E−01 | −7.1637490E−02 |
| 10 | 0.0000000E+00 | 1.9050484E−03 | 8.7464856E−03 | −2.6289096E−02 | −9.5478724E−03 |
| 11 | 0.0000000E+00 | 2.1669339E−02 | 5.8394812E−02 | 3.6347534E−02 | −1.0451306E−03 |

| SURFACE NUMBER | RB7 | RB8 | RB9 | RB10 | RB11 |
|---|---|---|---|---|---|
| 3 | −6.8699860E−05 | 1.4949513E−05 | 6.6339010E−06 | 1.2198017E−06 | −2.4650358E−09 |
| 4 | 7.9407753E−03 | 1.5008694E−03 | −6.5976813E−04 | −7.9337856E−04 | −4.9553027E−04 |
| 5 | 3.6852641E−03 | 5.4854260E−04 | −2.1961763E−03 | −1.3341522E−03 | 4.1856852E−04 |
| 6 | 3.2763374E−02 | −2.1368068E−03 | −2.8621299E−02 | −1.8968729E−02 | 1.9458117E−02 |
| 8 | −2.1305053E+00 | −1.4405172E+01 | −1.3658059E+01 | 3.7183901E+01 | 7.4843651E+01 |
| 9 | 9.1294177E−03 | 2.2019383E−02 | 1.4114025E−03 | −1.0794294E−02 | −1.0127014E−02 |

TABLE 8-continued

EXAMPLE 3 ASPHERIC SURFACE DATA

| | | | | | |
|---|---|---|---|---|---|
| 10 | 2.0879089E−02 | 3.1043772E−02 | 1.6425456E−02 | −1.0714499E−02 | −2.7911458E−03 |
| 11 | −1.1338876E−02 | −8.3936113E−03 | 1.4533359E−03 | 1.3554664E−02 | 3.0978124E−03 |

| SURFACE NUMBER | RB12 | RB13 | RB14 | RB15 | RB16 |
|---|---|---|---|---|---|
| 3 | −1.3845888E−07 | −4.6708613E−08 | −8.4301571E−09 | 2.2968869E−09 | 2.3253601E−09 |
| 4 | −1.9793469E−04 | −7.6456815E−05 | −9.1634737E−06 | 1.2321420E−05 | 1.4541754E−05 |
| 5 | 2.1991603E−04 | 4.4980934E−05 | −9.1526557E−06 | −1.3940304E−05 | −1.0404351E−05 |
| 6 | 1.8556248E−02 | −1.7849847E−02 | −3.2627356E−03 | 1.1151303E−02 | −1.9471592E−03 |
| 8 | −4.4850582E+01 | −1.4691934E+02 | −6.2280808E+01 | 9.6623817E+01 | −9.5120151E+01 |
| 9 | 7.3707904E−04 | 7.7561134E−03 | 7.3756469E−03 | 1.7409763E−03 | −5.6498438E−03 |
| 10 | −3.6795124E−03 | 0.0000000E+00 | 0.0000000E+00 | 0.0000000E+00 | 0.0000000E+00 |
| 11 | −5.8162426E−03 | 0.0000000E+00 | 0.0000000E+00 | 0.0000000E+00 | 0.0000000E+00 |

| SURFACE NUMBER | RB17 | RB18 | RB19 | RB20 |
|---|---|---|---|---|
| 3 | 4.0753560E−10 | −1.0306345E−10 | −1.2092951E−11 | 8.6242429E−12 |
| 4 | 9.8571145E−06 | 5.7113454E−06 | −1.3187206E−06 | −1.2686667E−06 |
| 5 | −7.6685235E−06 | −4.6062858E−06 | −4.9055829E−07 | 3.1145130E−06 |
| 6 | −9.6992626E−04 | −4.5711915E−04 | −1.2178703E−03 | 7.6653159E−04 |
| 8 | 7.9740173E+02 | −5.2047270E+01 | −1.2747346E+03 | 6.3568621E+02 |
| 9 | −1.1239174E−02 | −1.0611602E−02 | −2.2764578E−03 | 1.6841160E−02 |
| 10 | 0.0000000E+00 | 0.0000000E+00 | 0.0000000E+00 | 0.0000300E+00 |
| 11 | 0.0000000E+00 | 0.0000000E+00 | 0.0000000E+00 | 0.0000300E+00 |

TABLE 9

EXAMPLE 3 DATA ABOUT CURVATURE RADIUS AT EFFECTIVE DIAMETER EDGE

| SURFACE NUMBER | ABSOLUTE VALUE | | RATIO OF ABSOLUTE VALUE TO FOCAL LENGTH | |
|---|---|---|---|---|
| 3 | |X3 − P3| | 15.17 | |X3 − P3|/f | 16.93 |
| 4 | |X4 − P4| | 2.87 | |X4 − P4|/f | 3.20 |
| 5 | |X5 − P5| | 5.07 | |X5 − P5|/f | 5.66 |
| 6 | |X6 − P6| | 6.29 | |X6 − P6|/f | 7.02 |
| 8 | |X8 − P8| | 28.69 | |X8 − P8|/f | 32.02 |
| 9 | |X9 − P9| | 1.25 | |X9 − P9|/f | 1.40 |
| 10 | |X10 − P10| | 3.13 | |X10 − P10|/f | 3.49 |
| 11 | |X11 − P11| | 5.51 | |X11 − P11|/f | 6.15 |

TABLE 10

EXAMPLE 4 LENS DATA

| Si | Ri | Di | Ndj | vdj |
|---|---|---|---|---|
| 1 | 24.1262 | 1.8000 | 1.7550 | 52.3 |
| 2 | 3.4847 | 2.4175 | | |
| 3* | −2.5813 | 1.1000 | 1.5339 | 56.0 |
| 4* | 2.2962 | 0.8500 | | |
| 5* | 2.7740 | 2.4382 | 1.6336 | 23.6 |
| 6* | −15.9016 | 0.9208 | | |
| 7 | (APERTURE STOP) | 0.1500 | | |
| 8* | 4.6144 | 1.5000 | 1.5339 | 56.0 |
| 9* | −1.1947 | 0.1500 | | |
| 10* | −2.0282 | 0.7476 | 1.6336 | 23.6 |
| 11* | −3.1566 | 0.5000 | | |
| 12 | ∞ | 0.5000 | 1.5231 | 54.5 |
| 13 | ∞ | 1.3294 | | |
| IMAGE PLANE | ∞ | | | |

EXAMPLE 4 VARIOUS DATA

| | |
|---|---|
| Fno. | 2.8 |
| 2ω | 184.6 |
| L | 14.23 |
| ED1 | 11.81 |
| f | 0.88 |
| f5 | −12.05 |
| f12 | −1.15 |
| f45 | 2.51 |
| f123 | −5.29 |

TABLE 11

EXAMPLE 4 ASPHERIC SURFACE DATA

| SURFACE NUMBER | KA | RB3 | RB4 | RB5 | RB6 |
|---|---|---|---|---|---|
| 3 | 0.0000000E+00 | 6.5522918E−02 | 2.7970030E−03 | −1.6606087E−03 | −5.646006E−04 |
| 4 | 0.0000000E+00 | 2.8885430E−02 | 1.1437433E−02 | −2.8578870E−02 | 1.4139396E−02 |
| 5 | 0.0000000E+00 | 2.7316362E−02 | −4.6138071E−02 | 1.8381226E−02 | 4.4341452E−03 |
| 6 | 0.0000000E+00 | −1.3705042E−02 | 4.6088105E−02 | −6.7675559E−02 | 1.7586395E−02 |
| 8 | 0.0000000E+00 | −1.0035000E−02 | 3.0887649E−01 | −3.0764833E+00 | 7.9119556E+00 |
| 9 | 0.0000000E+00 | 3.5841377E−02 | −2.1972155E−01 | 1.3216262E−01 | −7.1562184E−02 |
| 10 | 0.0000000E+00 | 1.9840670E−03 | 8.7778913E−03 | −2.6232907E−02 | −9.4892698E−03 |
| 11 | 0.0000000E+00 | 2.2589719E−02 | 5.9210266E−02 | 3.6891003E−02 | −7.0860205E−04 |

| SURFACE NUMBER | RB7 | RB8 | RB9 | RB10 | RB11 |
|---|---|---|---|---|---|
| 3 | −6.8677185E−05 | 1.4945588E−05 | 6.6313265E−06 | 1.2191549E−06 | −2.7313938E−09 |
| 4 | 7.9419264E−03 | 1.5014321E−03 | −6.5961003E−04 | −7.9344542E−04 | −4.9568738E−04 |
| 5 | 3.6896005E−03 | 5.4965775E−04 | −2.1960697E−03 | −1.3342082E−03 | 4.1858684E−04 |

TABLE 11-continued

EXAMPLE 4 ASPHERIC SURFACE DATA

| | | | | | |
|---|---|---|---|---|---|
| 6 | 3.2807856E−02 | −2.1116955E−03 | −2.8610619E−02 | −1.8966993E−02 | 1.9455494E−02 |
| 8 | −2.1314048E+00 | −1.4405640E+01 | −1.3657856E+01 | 3.7185052E+01 | 7.4846077E+01 |
| 9 | 9.2096278E−03 | 2.2083918E−02 | 1.4439199E−03 | −1.0801351E−02 | −1.0172095E−02 |
| 10 | 2.0927093E−02 | 3.1081643E−02 | 1.6461779E−02 | −1.0669211E−02 | −2.7288951E−03 |
| 11 | −1.1138335E−02 | −8.2781202E−03 | 1.5155482E−03 | 1.3581183E−02 | 3.0966122E−03 |

| SURFACE NUMBER | RB12 | RB13 | RB14 | RB15 | RB16 |
|---|---|---|---|---|---|
| 3 | −1.3839446E−07 | −4.6734894E−08 | −8.4687214E−09 | 2.3013376E−09 | 2.3146927E−09 |
| 4 | −1.9809649E−04 | −7.6584262E−05 | −9.2449334E−06 | 1.2278136E−05 | 1.4526395E−05 |
| 5 | 2.2001913E−04 | 4.5119361E−05 | −9.0234729E−06 | −1.3843118E−05 | −1.0343116E−05 |
| 6 | 1.8552531E−02 | −1.7852946E−02 | −3.2644300E−03 | 1.1150798E−02 | −1.9474196E−03 |
| 8 | −4.4846532E+01 | −1.4691336E+02 | −6.2272704E+01 | 9.6633944E+01 | −9.5108581E+01 |
| 9 | 6.6249112E−04 | 7.6651830E−03 | 7.2838562E−03 | 1.6640890E−03 | −5.6957088E−03 |
| 10 | −3.5971002E−03 | 0.0000000E+00 | 0.0000000E+00 | 0.0000000E+00 | 0.0000000E+00 |
| 11 | −5.8430545E−03 | 0.0000000E+00 | 0.0000000E+00 | 0.0000000E+00 | 0.0000000E+00 |

| SURFACE NUMBER | RB17 | RB18 | RB19 | RB20 |
|---|---|---|---|---|
| 3 | 4.1300679E−10 | −1.3598986E−10 | −1.4996109E−11 | 1.3911701E−11 |
| 4 | 9.8590709E−06 | 5.7227960E−06 | −1.3056870E−06 | −1.2550140E−06 |
| 5 | −7.6395908E−06 | −4.6007017E−06 | −5.0056940E−07 | 3.0964045E−06 |
| 6 | −9.7077081E−04 | −4.5973457E−04 | −1.2233143E−03 | 7.5731567E−04 |
| 8 | 7.9741347E+02 | −5.2037295E+01 | −1.2747282E+03 | 6.3569030E+02 |
| 9 | −1.1240127E−02 | −1.0553775E−02 | −2.1483946E−03 | 1.7049606E−02 |
| 10 | 0.0000000E+00 | 0.0000000E+00 | 0.0000000E+00 | 0.0000000E+00 |
| 11 | 0.0000000E+00 | 0.0000000E+00 | 0.0000000E+00 | 0.0000000E+00 |

TABLE 12

EXAMPLE 4 DATA ABOUT CURVATURE RADIUS AT EFFECTIVE DIAMETER EDGE

| SURFACE NUMBER | ABSOLUTE VALUE | | RATIO OF ABSOLUTE VALUE TO FOCAL LENGTH | |
|---|---|---|---|---|
| 3 | \|X3 − P3\| | 15.18 | \|X3 − P3\|/f | 17.21 |
| 4 | \|X4 − P4\| | 2.78 | \|X4 − P4\|/f | 3.15 |
| 5 | \|X5 − P5\| | 4.67 | \|X5 − P5\|/f | 5.29 |
| 6 | \|X6 − P6\| | 6.36 | \|X6 − P6\|/f | 7.20 |
| 8 | \|X8 − P8\| | 34.64 | \|X8 − P8\|/f | 39.26 |
| 9 | \|X9 − P9\| | 1.25 | \|X9 − P9\|/f | 1.42 |
| 10 | \|X10 − P10\| | 3.13 | \|X10 − P10\|/f | 3.55 |
| 11 | \|X11 − P11\| | 5.23 | \|X11 − P11\|/f | 5.93 |

TABLE 13

EXAMPLE 5 LENS DATA

| Si | Ri | Di | Ndj | vdj |
|---|---|---|---|---|
| 1 | 22.0465 | 1.8000 | 1.8040 | 46.6 |
| 2 | 3.5387 | 2.4397 | | |
| 3* | −2.6567 | 1.1000 | 1.5316 | 55.4 |
| 4* | 2.1681 | 0.8502 | | |
| 5* | 2.5998 | 2.7511 | 1.6140 | 25.5 |
| 6* | −12.8952 | 0.9831 | | |
| 7 | (APERTURE STOP) | 0.1500 | | |
| 8* | 5.8258 | 1.5021 | 1.5316 | 55.4 |
| 9* | −1.2219 | 0.1500 | | |
| 10* | −2.0936 | 0.7481 | 1.6140 | 25.5 |
| 11* | −3.1766 | 0.8000 | | |
| 12 | ∞ | 0.5000 | 1.5231 | 54.5 |
| 13 | ∞ | 1.1376 | | |
| IMAGE PLANE | ∞ | | | |

EXAMPLE 5 VARIOUS DATA

| | |
|---|---|
| Fno. | 2.8 |
| 2ω | 184.4 |
| L | 14.74 |
| ED1 | 11.81 |
| f | 0.89 |
| f5 | −13.57 |
| f12 | −1.12 |
| f45 | 2.62 |
| f123 | −6.34 |

TABLE 14

EXAMPLE 5 ASPHERIC SURFACE DATA

| SURFACE NUMBER | KA | RB3 | RB4 | RB5 | RB6 |
|---|---|---|---|---|---|
| 3 | 0.0000000E+00 | 6.4955310E−02 | 2.6515377E−03 | −1.7042030E−03 | −5.7979692E−04 |
| 4 | 0.0000000E+00 | 3.3432457E−02 | 1.3705602E−02 | −2.7619765E−02 | 1.4556968E−02 |
| 5 | 0.0000000E+00 | 2.9747558E−02 | −4.5268345E−02 | 1.8865731E−02 | 4.6804008E−03 |
| 6 | 0.0000000E+00 | −1.4051327E−02 | 4.6038329E−02 | −6.7197736E−02 | 1.8463412E−02 |
| 8 | 0.0000000E+00 | −1.0569757E−02 | 3.0241906E−01 | −3.0821321E+00 | 7.9095311E+00 |
| 9 | 0.0000000E+00 | 3.5160641E−02 | −2.2063139E−01 | 1.3110645E−01 | −7.1559620E−02 |
| 10 | 0.0000000E+00 | 5.2618370E−03 | 1.2516129E−02 | −2.2592565E−02 | −7.0375976E−03 |
| 11 | 0.0000000E+00 | 2.4963598E−02 | 6.2017330E−02 | 3.6635785E−02 | −1.9819240E−03 |

TABLE 14-continued

EXAMPLE 5 ASPHERIC SURFACE DATA

| SURFACE NUMBER | RB7 | RB8 | RB9 | RB10 | RB11 |
|---|---|---|---|---|---|
| 3 | −7.3316787E−05 | 1.3854984E−05 | 6.5350029E−06 | 1.3005818E−06 | 5.6090935E−08 |
| 4 | 8.1343831E−03 | 1.5902241E−03 | −6.2206054E−04 | −7.8090382E−04 | −4.9440141E−04 |
| 5 | 3.8003308E−03 | 5.9604130E−04 | −2.1747551E−03 | −1.3209907E−03 | 4.2946271E−04 |
| 6 | 3.3703599E−02 | −1.4913609E−03 | −2.8366883E−02 | −1.9055292E−02 | 1.9156785E−02 |
| 8 | −2.1303767E+00 | −1.4401890E+01 | −1.3652368E+01 | 3.7190146E+01 | 7.4846530E+01 |
| 9 | 9.8391165E−03 | 2.2889498E−02 | 2.0277619E−03 | −1.0632212E−02 | −1.0386637E−02 |
| 10 | 2.1959920E−02 | 3.0960548E−02 | 1.5641233E−02 | −1.1742848E−02 | −3.7280712E−03 |
| 11 | −1.2139674E−02 | −8.6382332E−03 | 1.7214152E−03 | 1.4027820E−02 | 3.3659615E−03 |

| SURFACE NUMBER | RB12 | RB13 | RB14 | RB15 | RB16 |
|---|---|---|---|---|---|
| 3 | −1.1154408E−07 | −3.9507708E−08 | −6.6537947E−09 | −5.9824647E−10 | 1.1935303E−09 |
| 4 | −2.0078673E−04 | −7.9944323E−05 | −1.1992124E−05 | 1.0451898E−05 | 1.3498463E−05 |
| 5 | 2.2964179E−04 | 5.3175552E−05 | −2.9369213E−06 | −9.7309705E−06 | −7.9619685E−06 |
| 6 | 1.8181589E−02 | −1.8185938E−02 | −3.4826136E−03 | 1.1073366E−02 | −1.8943998E−03 |
| 8 | −4.4859726E+01 | −1.4695755E+02 | −6.2375661E+01 | 9.6434445E+01 | −9.5435677E+01 |
| 9 | 2.3928665E−04 | 7.2668815E−03 | 7.1242531E−03 | 1.8764132E−03 | −5.1352525E−03 |
| 10 | −4.3349819E−03 | 0.0000000E+00 | 0.0000000E+00 | 0.0000000E+00 | 0.0000000E+00 |
| 11 | −6.1741036E−03 | 0.0000000E+00 | 0.0000000E+00 | 0.0000000E+00 | 0.0000000E+00 |

| SURFACE NUMBER | RB17 | RB18 | RB19 | RB20 |
|---|---|---|---|---|
| 3 | 7.5596215E−10 | 5.9611248E−11 | −4.7234010E−11 | −1.6583107E−12 |
| 4 | 9.3800574E−06 | 5.6256954E−06 | −1.2020875E−06 | −1.1349227E−06 |
| 5 | −6.5371014E−06 | −4.4735936E−06 | −9.2934732E−07 | 2.3783233E−06 |
| 6 | −8.3234752E−04 | −2.9423999E−04 | −1.1310753E−03 | 6.8149539E−04 |
| 8 | 7.9699270E+02 | −5.2288634E+01 | −1.2739103E+03 | 6.3915119E+02 |
| 9 | −1.0473583E−02 | −9.9849600E−03 | −2.4181255E−03 | 1.4988144E−02 |
| 10 | 0.0000000E+00 | 0.0000000E+00 | 0.0000000E+00 | 0.0000000E+00 |
| 11 | 0.0000000E+00 | 0.0000000E+00 | 0.0000000E+00 | 0.0000000E+00 |

TABLE 15

EXAMPLE 5 DATA ABOUT CURVATURE RADIUS AT EFFECTIVE DIAMETER EDGE

| SURFACE NUMBER | ABSOLUTE VALUE | | RATIO OF ABSOLUTE VALUE TO FOCAL LENGTH | |
|---|---|---|---|---|
| 3 | \|X3 − P3\| | 13.19 | \|X3 − P3\|/f | 14.84 |
| 4 | \|X4 − P4\| | 2.58 | \|X4 − P4\|/f | 2.90 |
| 5 | \|X5 − P5\| | 3.90 | \|X5 − P5\|/f | 4.39 |
| 6 | \|X6 − P6\| | 5.63 | \|X6 − P6\|/f | 6.33 |
| 8 | \|X8 − P8\| | 9.60 | \|X8 − P8\|/f | 10.80 |
| 9 | \|X9 − P9\| | 1.26 | \|X9 − P9\|/f | 1.42 |
| 10 | \|X10 − P10\| | 3.93 | \|X10 − P10\|/f | 4.42 |
| 11 | \|X11 − P11\| | 4.77 | \|X11 − P11\|/f | 5.37 |

TABLE 16

EXAMPLE 6 LENS DATA

| Si | Ri | Di | Ndj | νdj |
|---|---|---|---|---|
| 1 | 21.4271 | 1.8000 | 1.8348 | 42.7 |
| 2 | 3.5947 | 2.3947 | | |
| 3* | −2.6508 | 1.1000 | 1.5316 | 55.4 |
| 4* | 2.1715 | 0.8502 | | |
| 5* | 2.5163 | 2.7193 | 1.6140 | 25.5 |
| 6* | −12.8023 | 0.9696 | | |
| 7 | (APERTURE STOP) | 0.1500 | | |
| 8* | 5.7701 | 1.5021 | 1.5316 | 55.4 |
| 9* | −1.2142 | 0.1500 | | |
| 10* | −2.1085 | 0.7481 | 1.6140 | 25.5 |
| 11* | −3.1751 | 0.8000 | | |
| 12 | ∞ | 0.5000 | 1.5231 | 54.5 |
| 13 | ∞ | 1.0607 | | |
| IMAGE PLANE | ∞ | | | |

EXAMPLE 6 VARIOUS DATA

| Fno. | 2.8 |
|---|---|
| 2ω | 184.4 |
| L | 14.57 |
| ED1 | 11.62 |
| f | 0.89 |
| f5 | −13.94 |
| f12 | −1.12 |
| f45 | 2.59 |
| f123 | −7.15 |

TABLE 17

EXAMPLE 6 ASPHERIC SURFACE DATA

| SURFACE NUMBER | KA | RB3 | RB4 | RB5 | RB6 |
|---|---|---|---|---|---|
| 3 | 0.0000000E+00 | 6.4930620E−02 | 2.6629037E−03 | −1.7006513E−03 | −5.7880329E−04 |
| 4 | 0.0000000E+00 | 3.3779008E−02 | 1.3759567E−03 | −2.7610266E−02 | 1.4559249E−02 |
| 5 | 0.0000000E+00 | 2.9603819E−02 | −4.5288299E−02 | 1.8861679E−02 | 4.6788226E−03 |
| 6 | 0.0000000E+00 | −1.4096706E−02 | 4.6020000E−02 | −6.7206637E−02 | 1.8457068E−02 |
| 8 | 0.0000000E+00 | −1.0597367E−02 | 3.0193680E−01 | −3.0830461E+00 | 7.9082564E+00 |
| 9 | 0.0000000E+00 | 3.5527367E−02 | −2.2036482E−01 | 1.3126658E−01 | −7.1487454E−02 |

TABLE 17-continued

EXAMPLE 6 ASPHERIC SURFACE DATA

| | | | | | |
|---|---|---|---|---|---|
| 10 | 0.0000000E+00 | 5.1146079E−03 | 1.2380583E−02 | −2.2666506E−02 | −7.0491474E−03 |
| 11 | 0.0000000E+00 | 2.5394178E−02 | 6.2267633E−02 | 3.6797145E−02 | −1.8703793E−03 |

| SURFACE NUMBER | RB7 | RB8 | RB9 | RB10 | RB11 |
|---|---|---|---|---|---|
| 3 | −7.3071889E−05 | 1.3904556E−05 | 6.5399708E−06 | 1.2981350E−06 | 5.4050779E−08 |
| 4 | 8.1354579E−03 | 1.5910210E−03 | −6.2145090E−04 | −7.8046664E−04 | −4.9410842E−04 |
| 5 | 3.7994687E−03 | 5.9555637E−04 | −2.1750286E−03 | −1.3211472E−03 | 4.2937104E−04 |
| 6 | 3.3699129E−02 | −1.4935280E−03 | −2.8366783E−02 | −1.9053475E−02 | 1.9159556E−02 |
| 8 | −2.1318325E+00 | −1.4403561E+01 | −1.3653881E+01 | 3.7189200E+01 | 7.4846859E+01 |
| 9 | 9.8198747E−03 | 2.2849832E−02 | 1.9597643E−03 | −1.0715298E−02 | −1.0474947E−02 |
| 10 | 2.2002232E−02 | 3.1045301E−02 | 1.5757208E−02 | −1.1605185E−02 | −3.5759286E−03 |
| 11 | −1.2058214E−02 | −8.5766508E−03 | 1.7703955E−03 | 1.4069913E−02 | 3.4056583E−03 |

| SURFACE NUMBER | RB12 | RB13 | RB14 | RB15 | RB16 |
|---|---|---|---|---|---|
| 3 | −1.1261155E−07 | −3.9934643E−08 | −6.8227803E−09 | −6.3667960E−10 | 1.1885831E−09 |
| 4 | −2.0060247E−04 | −7.9834662E−05 | −1.1931124E−05 | 1.0483136E−05 | 1.3512295E−05 |
| 5 | 2.2958590E−04 | 5.3140702E−05 | −2.9582639E−06 | −9.7436457E−06 | −7.9690631E−06 |
| 6 | 1.8184594E−02 | −1.8183250E−02 | −3.4805974E−03 | 1.1074570E−02 | −1.8940172E−03 |
| 8 | −4.4856978E+01 | −1.4695050E+02 | −6.2361785E+01 | 9.6458564E+01 | −9.5397550E+01 |
| 9 | 1.5325689E−04 | 7.1894977E−03 | 7.0617411E−03 | 1.8357444E−03 | −5.1454629E−03 |
| 10 | −4.1732019E−03 | 0.0000000E+00 | 0.0000000E+00 | 0.0000000E+00 | 0.0000000E+00 |
| 11 | −6.1332256E−03 | 0.0000000E+00 | 0.0000000E+00 | 0.0000000E+00 | 0.0000000E+00 |

| SURFACE NUMBER | RB17 | RB18 | RB19 | RB20 |
|---|---|---|---|---|
| 3 | 7.5352562E−10 | 6.1963730E−11 | −4.4336017E−11 | −1.1659443E−12 |
| 4 | 9.3844835E−06 | 5.6256174E−06 | −1.2040683E−06 | −1.1373659E−06 |
| 5 | −6.5407543E−06 | −4.4753747E−06 | −9.3014762E−07 | 2.3778526E−06 |
| 6 | −8.3263578E−04 | −2.9495812E−04 | −1.1318634E−03 | 6.8102934E−04 |
| 8 | 7.9704617E+02 | −5.2221594E+01 | −1.2738475E+03 | 6.3915554E+02 |
| 9 | −1.0442810E−02 | −8.9993428E−03 | −2.2603386E−03 | 1.5240202E−02 |
| 10 | 0.0000000E+00 | 0.0000000E+00 | 0.0000000E+00 | 0.0000000E+00 |
| 11 | 0.0000000E+00 | 0.0000000E+00 | 0.0000000E+00 | 0.0000000E+00 |

TABLE 18

EXAMPLE 6 DATA ABOUT CURVATURE RADIUS AT EFFECTIVE DIAMETER EDGE

| SURFACE NUMBER | ABSOLUTE VALUE | | RATIO OF ABSOLUTE VALUE TO FOCAL LENGTH | |
|---|---|---|---|---|
| 3 | \|X3 − P3\| | 13.24 | \|X3 − P3\|/f | 14.90 |
| 4 | \|X4 − P4\| | 2.56 | \|X4 − P4\|/f | 2.88 |
| 5 | \|X5 − P5\| | 3.75 | \|X5 − P5\|/f | 4.22 |
| 6 | \|X6 − P6\| | 5.66 | \|X6 − P6\|/f | 6.37 |
| 8 | \|X8 − P8\| | 10.69 | \|X8 − P8\|/f | 12.03 |
| 9 | \|X9 − P9\| | 1.26 | \|X9 − P9\|/f | 1.42 |
| 10 | \|X10 − P10\| | 4.00 | \|X10 − P10\|/f | 4.50 |
| 11 | \|X11 − P11\| | 4.61 | \|X11 − P11\|/f | 5.19 |

TABLE 19

EXAMPLE 7 LENS DATA

| Si | Ri | Di | Ndj | νdj |
|---|---|---|---|---|
| 1 | 19.2587 | 1.8000 | 1.7725 | 49.6 |
| 2 | 3.4098 | 2.4811 | | |
| 3* | −2.3929 | 1.1000 | 1.5338 | 56.0 |
| 4* | 2.1860 | 0.8500 | | |
| 5* | 2.6255 | 2.1950 | 1.6336 | 23.6 |
| 6* | −14.3666 | 0.6774 | | |
| 7 | (APERTURE STOP) | 0.1502 | | |
| 8* | 4.5602 | 1.5000 | 1.5338 | 56.0 |
| 9* | −1.1375 | 0.1500 | | |
| 10* | −2.1791 | 0.7526 | 1.6336 | 23.6 |
| 11* | −3.1389 | 0.5000 | | |
| 12 | ∞ | 0.5000 | 1.5231 | 54.5 |
| 13 | ∞ | 1.0424 | | |
| IMAGE PLANE | ∞ | | | |

EXAMPLE 7 VARIOUS DATA

| | |
|---|---|
| Fno. | 2.8 |
| 2ω | 194.2 |
| L | 13.53 |
| ED1 | 12.02 |
| f | 0.81 |
| f5 | −16.16 |
| f12 | −1.09 |
| f45 | 2.31 |
| f123 | −5.66 |

TABLE 20

EXAMPLE 7 ASPHERIC SURFACE DATA

| SURFACE NUMBER | KA | RB3 | RB4 | RB5 | RB6 |
|---|---|---|---|---|---|
| 3 | 0.0000000E+00 | 6.5784948E−02 | 2.6921421E−03 | −1.6814466E−03 | −5.6441883E−04 |
| 4 | 0.0000000E+00 | 2.5467471E−02 | 1.0973634E−02 | −2.8648754E−02 | 1.4130106E−02 |
| 5 | 0.0000000E+00 | 3.0210493E−02 | −4.5713156E−02 | 1.8469268E−02 | 4.4537694E−03 |

TABLE 20-continued

EXAMPLE 7 ASPHERIC SURFACE DATA

| | | | | | |
|---|---|---|---|---|---|
| 6 | 0.0000000E+00 | −1.4542168E−02 | 4.6066698E−02 | −6.7522833E−02 | 1.7791462E−02 |
| 8 | 0.0000000E+00 | −1.0781609E−02 | 3.0840395E−01 | −3.0769393E+00 | 7.9119582E+00 |
| 9 | 0.0000000E+00 | 3.8573797E−02 | −2.1816534E−01 | 1.3328485E−01 | −7.0688933E−02 |
| 10 | 0.0000000E+00 | 2.5071707E−05 | 7.4393884E−03 | −2.7227041E−02 | −1.0195000E−02 |
| 11 | 0.0000000E+00 | 2.8831448E−02 | 6.2967844E−02 | 3.9522955E−02 | 1.2108256E−03 |

| SURFACE NUMBER | RB7 | RB8 | RB9 | RB10 | RB11 |
|---|---|---|---|---|---|
| 3 | −6.6846736E−05 | 1.5937542E−05 | 7.0484847E−06 | 1.3813679E−06 | 5.9088470E−08 |
| 4 | 7.9420975E−03 | 1.5023182E−03 | −6.5923090E−04 | −7.9344225E−04 | −4.9581639E−04 |
| 5 | 3.6914261E−03 | 5.4696935E−04 | −2.1992834E−03 | −1.3368571E−03 | 4.1667164E−04 |
| 6 | 3.3012922E−02 | −1.9336642E−03 | −2.8469528E−02 | −1.8863789E−02 | 1.9522813E−02 |
| 8 | −2.1301046E+00 | −1.4401912E+01 | −1.3650058E+01 | 3.7199445E+01 | 7.4870696E+01 |
| 9 | 9.8845628E−03 | 2.2585182E−02 | 1.7925446E−03 | −1.0584308E−02 | −1.0064037E−02 |
| 10 | 2.0513753E−02 | 3.0965419E−02 | 1.6641411E−02 | −1.0196911E−02 | −1.9656694E−03 |
| 11 | −9.7705085E−03 | −7.3666136E−03 | 2.0425859E−03 | 1.3787068E−02 | 3.0362725E−03 |

| SURFACE NUMBER | RB12 | RB13 | RB14 | RB15 | RB16 |
|---|---|---|---|---|---|
| 3 | −1.1573499E−07 | −3.8958402E−08 | −6.0695450E−09 | 2.8831902E−09 | 2.3681682E−09 |
| 4 | −1.9822266E−04 | −7.6661285E−05 | −9.2710856E−06 | 1.2291477E−05 | 1.4559614E−05 |
| 5 | 2.1872834E−04 | 4.4289030E−05 | −9.5435786E−06 | −1.4159589E−05 | −1.0530610E−05 |
| 6 | 1.8585991E−02 | −1.7851550E−02 | −3.2945384E−03 | 1.1089159E−02 | −2.0407765E−03 |
| 8 | −4.4805896E+01 | −1.4684759E+02 | −6.2167494E+01 | 9.6800997E+01 | −9.4845008E+01 |
| 9 | 6.8678077E−04 | 7.6359393E−03 | 7.2386041E−03 | 1.6505601E−03 | −5.6158983E−03 |
| 10 | −2.5419917E−03 | 0.0000000E+00 | 0.0000000E+00 | 0.0000000E+00 | 0.0000000E+00 |
| 11 | −6.1222657E−03 | 0.0000000E+00 | 0.0000000E+00 | 0.0000000E+00 | 0.0000000E+00 |

| SURFACE NUMBER | RB17 | RB18 | RB19 | RB20 |
|---|---|---|---|---|
| 3 | 3.5455837E−10 | −1.9516248E−10 | −5.5758215E−11 | −1.0395742E−11 |
| 4 | 9.9006408E−06 | 5.7635161E−06 | −1.2675363E−06 | −1.2256471E−06 |
| 5 | −7.7480023E−06 | −4.6606102E−06 | −5.3486449E−07 | 3.0776601E−06 |
| 6 | −1.0946299E−03 | −6.1403839E−04 | −1.4072234E−03 | 5.4584673E−04 |
| 8 | 7.9782632E+02 | −5.1397105E+01 | −1.2737500E+03 | 6.3712636E+02 |
| 9 | −1.0987288E−02 | −1.0022350E−02 | −1.2026553E−02 | 1.8588045E−02 |
| 10 | 0.0000000E+00 | 0.0000000E+00 | 0.0000000E+00 | 0.0000000E+00 |
| 11 | 0.0000000E+00 | 0.0000000E+00 | 0.0000000E+00 | 0.0000000E+00 |

TABLE 21

EXAMPLE 7 DATA ABOUT CURVATURE RADIUS AT EFFECTIVE DIAMETER EDGE

| SURFACE NUMBER | ABSOLUTE VALUE | | RATIO OF ABSOLUTE VALUE TO FOCAL LENGTH | |
|---|---|---|---|---|
| 3 | \|X3 − P3\| | 11.08 | \|X3 − P3\|/f | 13.73 |
| 4 | \|X4 − P4\| | 2.35 | \|X4 − P4\|/f | 2.91 |
| 5 | \|X5 − P5\| | 3.02 | \|X5 − P5\|/f | 3.75 |
| 6 | \|X6 − P6\| | 8.58 | \|X6 − P6\|/f | 10.63 |
| 8 | \|X8 − P8\| | 28.30 | \|X8 − P8\|/f | 35.08 |
| 9 | \|X9 − P9\| | 1.23 | \|X9 − P9\|/f | 1.53 |
| 10 | \|X10 − P10\| | 3.10 | \|X10 − P10\|/f | 3.84 |
| 11 | \|X11 − P11\| | 4.12 | \|X11 − P11\|/f | 5.11 |

TABLE 22

EXAMPLE 8 LENS DATA

| Si | Ri | Di | Ndj | νdj |
|---|---|---|---|---|
| 1 | 19.2869 | 1.1000 | 1.7725 | 49.6 |
| 2 | 3.8350 | 2.5663 | | |
| 3* | −2.7442 | 1.1003 | 1.5316 | 55.4 |
| 4* | 2.0941 | 0.8500 | | |
| 5* | 2.6140 | 2.6506 | 1.6140 | 25.5 |
| 6* | −19.6251 | 0.9411 | | |
| 7 | (APERTURE STOP) | 0.1500 | | |
| 8* | 6.2688 | 1.5053 | 1.5316 | 55.4 |
| 9* | −1.1084 | 0.1000 | | |
| 10* | −2.0955 | 0.7000 | 1.6140 | 25.5 |
| 11* | −3.1130 | 0.8000 | | |
| 12 | ∞ | 0.5000 | 1.5231 | 54.5 |
| 13 | ∞ | 1.0512 | | |
| IMAGE PLANE | ∞ | | | |

EXAMPLE 8 VARIOUS DATA

| | |
|---|---|
| Fno. | 2.8 |
| 2ω | 191.0 |
| L | 13.84 |
| ED1 | 11.42 |
| f | 0.85 |
| f5 | −14.14 |
| f12 | −1.18 |
| f45 | 2.39 |

TABLE 23

EXAMPLE 8 ASPHERIC SURFACE DATA

| SURFACE NUMBER | KA | RB3 | RB4 | RB5 | RB6 |
|---|---|---|---|---|---|
| 3 | 0.0000000E+00 | 6.2117843E−02 | 3.0480176E−03 | −1.6736087E−03 | −5.5956639E−04 |
| 4 | 0.0000000E+00 | 4.4373296E−02 | 3.0545696E−03 | −2.4978017E−02 | 1.7192600E−02 |

TABLE 23-continued

EXAMPLE 8 ASPHERIC SURFACE DATA

| 5 | 0.0000000E+00 | 2.9856409E−02 | −4.7637317E−02 | 2.0746607E−02 | 6.4793605E−03 |
|---|---|---|---|---|---|
| 6 | 0.0000000E+00 | −2.0298767E−02 | 5.0467941E−02 | −6.5155744E−02 | 1.7132414E−02 |
| 8 | 0.0000000E+00 | −8.9320799E−03 | 2.5868480E−01 | −3.0310532E+00 | 8.1199828E+00 |
| 9 | 0.0000000E+00 | 3.4347938E−02 | −1.7535448E−01 | 1.3589952E−01 | −7.2153070E−02 |
| 10 | 0.0000000E+00 | −6.7682276E−04 | 4.5320425E−02 | 1.0729310E−02 | 1.1044048E−02 |
| 11 | 0.0000000E+00 | 1.3546828E−02 | 6.8664944E−02 | 3.6742271E−02 | 9.3706856E−03 |

| SURFACE NUMBER | RB7 | RB8 | RB9 | RB10 | RB11 |
|---|---|---|---|---|---|
| 3 | −6.3768964E−05 | 1.6601208E−05 | 7.0986057E−06 | 1.5244029E−06 | 5.3416672E−08 |
| 4 | 9.1984339E−03 | 1.9202135E−03 | −5.5906093E−04 | −8.0208614E−04 | −5.1357880E−04 |
| 5 | 4.3509888E−03 | 5.8227842E−04 | −2.3195082E−03 | −1.4338502E−03 | 3.8888372E−04 |
| 6 | 3.2727051E−02 | −1.4222121E−03 | −2.7723413E−02 | −1.8536190E−02 | 1.9295329E−02 |
| 8 | −2.8607425E+00 | −1.4022403E+01 | −1.3438187E+01 | 3.7106194E+01 | 7.4886402E+01 |
| 9 | 1.0050926E−02 | 2.2602701E−02 | −7.8629859E−04 | −1.5853820E−02 | −1.5179032E−02 |
| 10 | 2.1343907E−02 | 2.0355421E−02 | 5.0168371E−03 | −1.8355640E−02 | −7.2564991E−05 |
| 11 | −4.5044244E−03 | −6.6194088E−03 | 2.5214120E−04 | 1.3440722E−02 | −5.7251492E−04 |

| SURFACE NUMBER | RB12 | RB13 | RB14 | RB15 | RB16 |
|---|---|---|---|---|---|
| 3 | −1.1275496E−07 | −4.6407802E−08 | −5.4463032E−09 | −1.5944369E−09 | 2.2514249E−09 |
| 4 | −2.1489764E−04 | −8.7967597E−05 | −1.5620315E−05 | 1.1986230E−05 | 1.2341892E−05 |
| 5 | 2.2494570E−04 | 6.1334199E−05 | 8.6456943E−06 | −1.5826481E−06 | −3.8972889E−06 |
| 6 | 1.8041177E−02 | −1.8460263E−02 | −3.7216504E−03 | 1.0932306E−02 | −1.9429324E−03 |
| 8 | −4.4207922E+01 | −1.4469232E+02 | −5.9741362E+01 | 9.7485517E+01 | −1.0166118E+02 |
| 9 | −3.0381386E−03 | 6.6961171E−03 | 9.7368006E−03 | 6.9595985E−03 | 9.1725229E−04 |
| 10 | −1.9129839E−04 | −1.5977530E−04 | −2.6151907E−05 | 1.4808691E−04 | 0.0000000E+00 |
| 11 | −7.0704711E−04 | −5.3642588E−04 | −1.2382189E−04 | 7.2644878E−04 | 0.0000000E+00 |

| SURFACE NUMBER | RB17 | RB18 | RB19 | RB20 |
|---|---|---|---|---|
| 3 | 9.5205497E−10 | −1.6939396E−10 | −1.4502909E−10 | 3.0677010E−11 |
| 4 | 8.7220875E−06 | 5.4275353E−06 | −8.5823545E−07 | −1.2792724E−06 |
| 5 | −5.3264057E−06 | −4.7350825E−06 | −1.6932651E−06 | 1.8635211E−06 |
| 6 | −8.0413474E−04 | −2.2480188E−04 | −1.0710806E−03 | 6.8396823E−04 |
| 8 | 7.7554963E+02 | −9.2913076E+01 | −1.2990023E+03 | 7.8444938E+02 |
| 9 | −4.8041633E−03 | −7.2092520E−03 | −4.5156765E−03 | 5.3178493E−03 |
| 10 | 0.0000000E+00 | 0.0000000E+00 | 0.0000000E+00 | 0.0000000E+00 |
| 11 | 0.0000000E+00 | 0.0000000E+00 | 0.0000000E+00 | 0.0000000E+00 |

TABLE 24

EXAMPLE 8 DATA ABOUT CURVATURE RADIUS AT EFFECTIVE DIAMETER EDGE

| SURFACE NUMBER | ABSOLUTE VALUE | | RATIO OF ABSOLUTE VALUE TO FOCAL LENGTH | |
|---|---|---|---|---|
| 3 | |X3 − P3| | 16.57 | |X3 − P3|/f | 19.59 |
| 4 | |X4 − P4| | 2.37 | |X4 − P4|/f | 2.81 |
| 5 | |X5 − P5| | 3.43 | |X5 − P5|/f | 4.05 |
| 6 | |X6 − P6| | 6.70 | |X6 − P6|/f | 7.92 |
| 8 | |X8 − P8| | 10.36 | |X8 − P8|/f | 12.24 |
| 9 | |X9 − P9| | 1.29 | |X9 − P9|/f | 1.52 |
| 10 | |X10 − P10| | 83.61 | |X10 − P10|/f | 98.81 |
| 11 | |X11 − P11| | 3.01 | |X11 − P11|/f | 3.56 |

In all of Examples 1 through 8, the first lens L1 is a spherical lens made of glass. Alternatively, one or both of the surfaces of the first lens L1 may aspheric. When the first lens L1 is an aspheric glass lens, it is possible to correct various aberrations in a more excellent manner.

In all of Examples 1 through 8, the second lens L2, the third lens L3, the fourth lens L4, and the fifth lens L5 are aspheric lenses made of plastic, and both of the surfaces of which are aspheric. When many aspheric surfaces are adopted, it is possible to improve the performance of the lens. Further, it is possible to reduce the weight of the lens and the cost for producing the lens by using a plastic material.

Table 25 shows values corresponding to formulas (1) through (13) of the imaging lenses of Examples 1 through 8. In Examples 1 through 8, d-line is reference wavelength, and Table 25 shows values at the reference wavelength. As table 25 shows, all of Examples 1 through 9 satisfy formulas (1) through (13).

TABLE 25

| | VALUE CORRESPONDING TO FORMULA | | | | | | | | | | | | |
|---|---|---|---|---|---|---|---|---|---|---|---|---|---|
| EXAMPLE | (1) (R3 − R4)/ (R3 + R4) | (2) D3/f | (3) D2/f | (4) D1/f | (5) L/f | (6) (R1 − R2)/ (R1 + R2) | (7) (R8 − R9)/ (R8 + R9) | (8) R9/R10 | (9) f5/f | (10) (R10 − R11)/ (R10 + R11) | (11) f45/f123 | (12) ED1/R1 | (13) f12/f |
| 1 | 2.08 | 1.32 | 2.59 | 2.04 | 15.76 | 0.71 | 1.34 | 0.50 | −45.56 | −0.10 | −0.40 | 0.59 | −1.13 |
| 2 | 9.42 | 1.27 | 2.72 | 2.08 | 16.73 | 0.76 | 1.36 | 0.50 | −21.13 | −0.17 | −0.30 | 0.47 | −1.32 |
| 3 | 18.44 | 1.23 | 2.68 | 2.01 | 15.95 | 0.75 | 1.70 | 0.59 | −13.21 | −0.22 | −0.49 | 0.48 | −1.30 |
| 4 | 17.11 | 1.25 | 2.74 | 2.04 | 16.13 | 0.75 | 1.70 | 0.59 | −13.66 | −0.22 | −0.48 | 0.49 | −1.30 |
| 5 | 9.87 | 1.24 | 2.74 | 2.02 | 16.58 | 0.72 | 1.53 | 0.58 | −15.26 | −0.21 | −0.41 | 0.54 | −1.26 |

TABLE 25-continued

| | VALUE CORRESPONDING TO FORMULA | | | | | | | | | | | | |
|---|---|---|---|---|---|---|---|---|---|---|---|---|---|
| EXAMPLE | (1) (R3 − R4)/ (R3 + R4) | (2) D3/f | (3) D2/f | (4) D1/f | (5) L/f | (6) (R1 − R2)/ (R1 + R2) | (7) (R8 − R9)/ (R8 + R9) | (8) R9/R10 | (9) f5/f | (10) (R10 − R11)/ (R10 + R11) | (11) f45/f123 | (12) ED1/R1 | (13) f12/f |
| 6 | 10.06 | 1.24 | 2.70 | 2.03 | 16.40 | 0.71 | 1.53 | 0.58 | −15.69 | −0.20 | −0.36 | 0.54 | −1.26 |
| 7 | 22.13 | 1.36 | 3.08 | 2.23 | 16.77 | 0.70 | 1.66 | 0.52 | −20.03 | −0.18 | −0.41 | 0.62 | −1.35 |
| 8 | 7.44 | 1.30 | 3.03 | 1.30 | 16.36 | 0.67 | 1.43 | 0.53 | −16.72 | −0.20 | −0.47 | 0.59 | −1.39 |

Figure 11G:
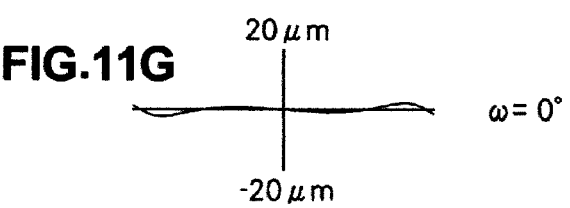
Figure 12F:
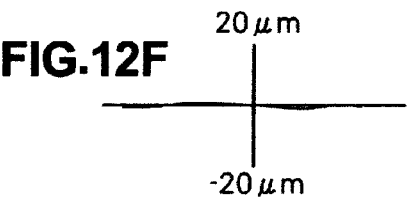
Figure 12G:
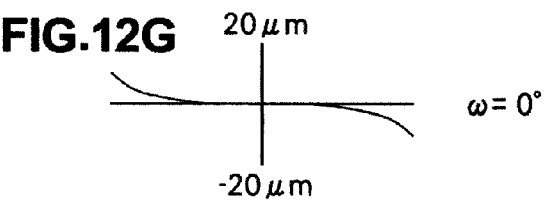
Figure 13G:
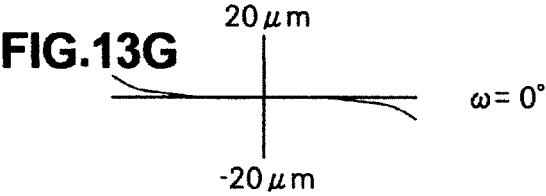
Figures 14A, 14B, 14C, 14D:
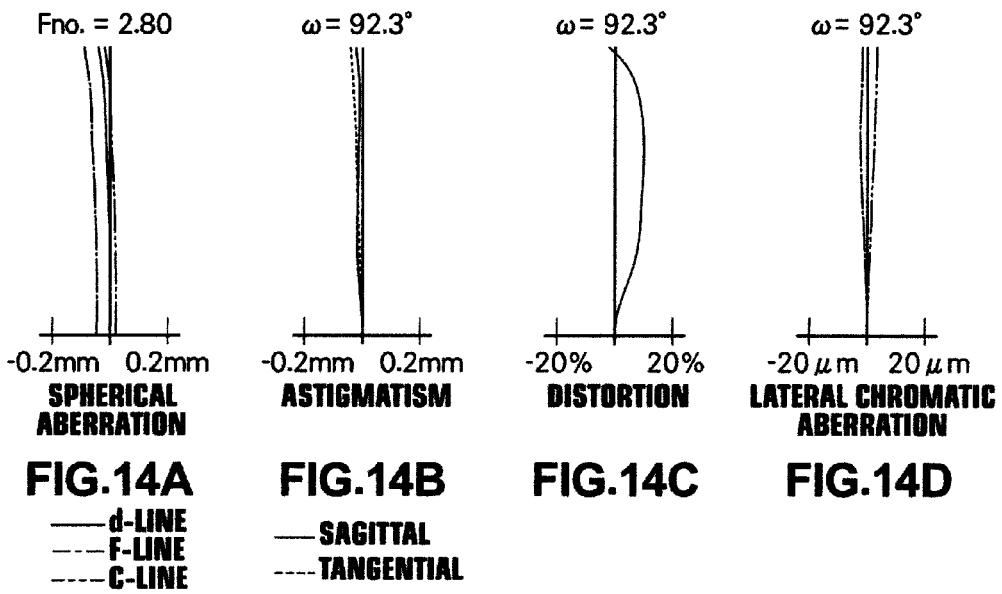
FIGS. 14A through 14I are aberration diagrams of the imaging lens according to Example 4.
Figures 14E, 14H:
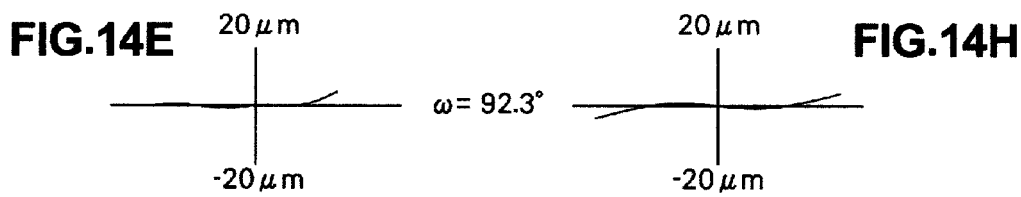
Figures 14F, 14I:
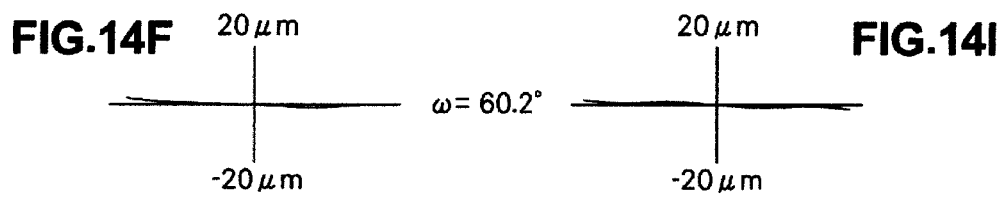
Figure 14G:
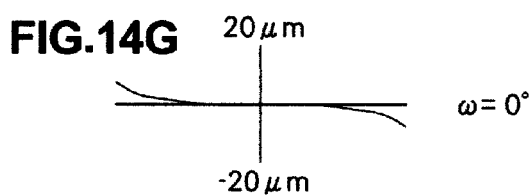
Figure 16F:
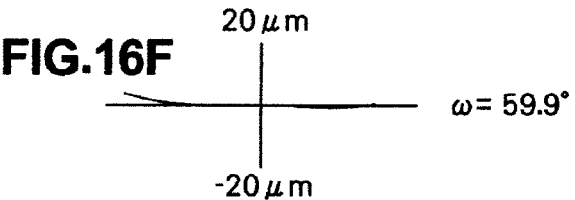
Figure 16G:
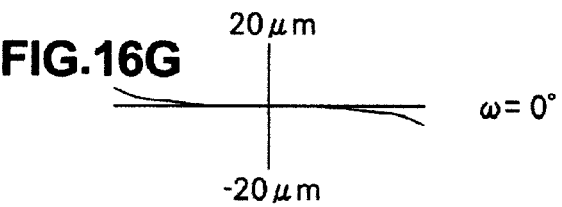

FIGS. 11A through 11I are diagrams illustrating aberrations of an imaging lens of Example 1. FIG. 11A illustrates spherical aberration, and FIG. 11B illustrates astigmatism. FIG. 11C illustrates distortion, and FIG. 11D illustrates lateral chromatic aberration. Further, FIGS. 11E through 11G are diagrams illustrating lateral aberrations in a tangential direction for each angle of view. FIGS. 11H through 11I are diagrams illustrating lateral aberrations in a sagittal direction for each half angle of view. The diagrams illustrating lateral aberrations in a tangential direction and the diagrams illustrating lateral aberration in a sagittal direction are arranged in such a manner that diagrams for the same half angle of view are next to each other in the horizontal direction. Each diagram illustrates aberration with respect to d-line (wavelength is 587.56 nm) as reference wavelength. Further, in the diagrams illustrating spherical aberration and lateral chromatic aberration, aberrations with respect to F-line (wavelength is 486.13 nm) and C-line (wavelength is 656.27 nm) are also illustrated. In the diagram illustrating spherical aberration, Fno. represents F-number, and in the other diagrams, ω represents half angle of view. The diagram illustrating distortion uses focal length f of the entire system and angle of view $\phi$(variable, $0 \leq \phi \leq \omega$), and shows a shift amount from ideal image height $2f \times \tan(\phi/2)$.

Similarly, FIGS. 12A through 12I, FIGS. 13A through 13I, FIGS. 14A through 14I, FIGS. 15A through 15I, FIGS. 16A through 16I, FIGS. 17A through 17I, and FIGS. 18A through 18I are diagrams illustrating spherical aberration, astigmatism, distortion, lateral chromatic aberration and lateral aberrations of imaging lenses of Examples 2 through 8. As these diagrams illustrating aberration show, each aberration is corrected in an excellent manner in Examples 1 through 8.

As these data show, each of the imaging lenses of Examples 1 through 8 is composed of five lenses, the number of which is small. The sizes of the imaging lenses of Examples 1 through 8 are small, and they can be produced at low cost. Further, the imaging lenses of Examples 1 through 8 can achieve extremely wide angles of view, the full angles of view exceeding 180 degrees. Further, F-number is 2.8, which is small. In the imaging lenses of Examples 1 through 8, each aberration is corrected in an excellent manner. Therefore, the imaging lenses of Examples 1 through 8 have high optical performance. These imaging lenses are appropriate to be mounted on a monitor camera, an in-vehicle camera, or the like. The in-vehicle camera photographs the front side, lateral sides, and rear side of a car or the like.

Figure 19:
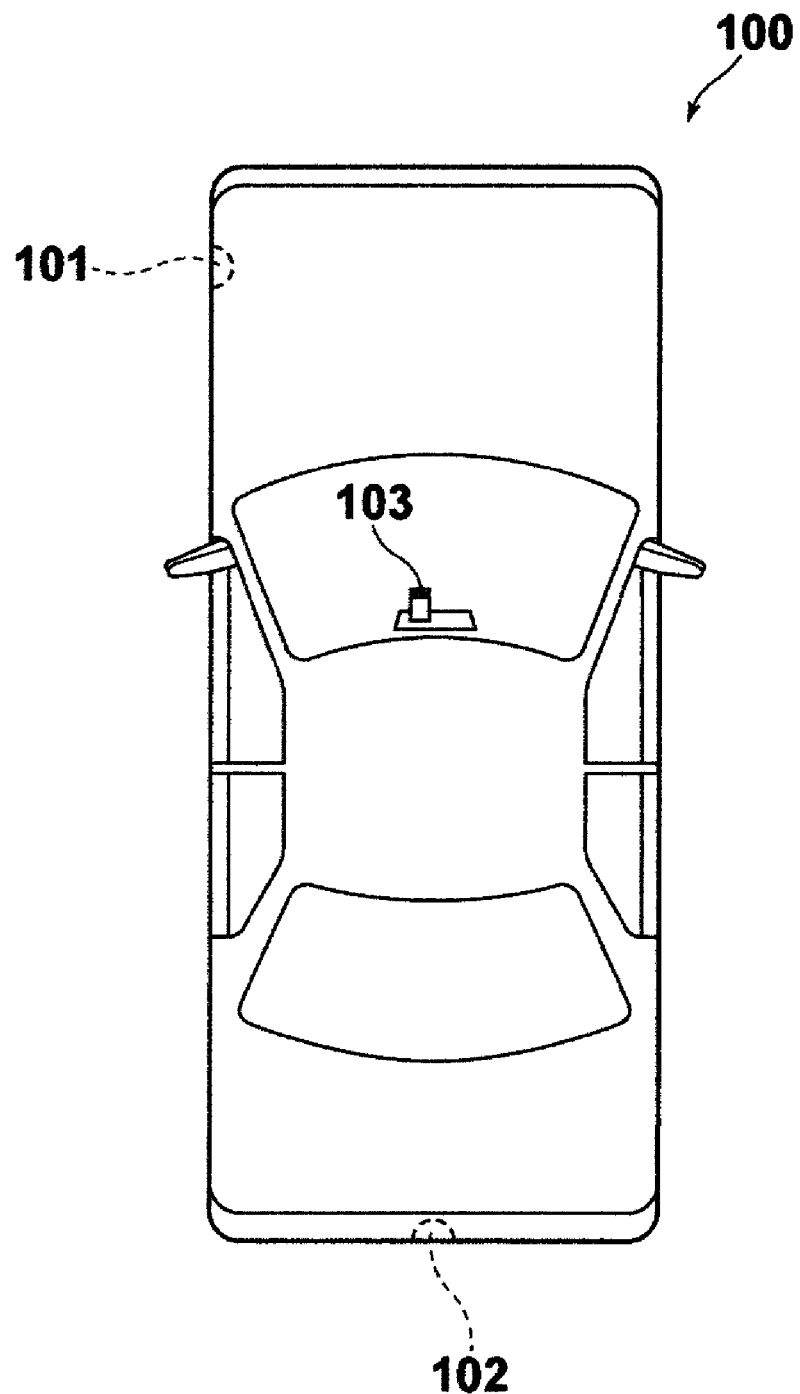
FIG. 19 is a diagram for explaining the arrangement of imaging apparatuses for in-vehicle use according to an embodiment of the present invention.

FIG. 19 illustrates, as an example, a manner of mounting an imaging apparatus including the imaging lens according to the embodiment of the present invention in a car 100. In FIG. 19, the car 100 includes an exterior camera 101, an exterior camera 102 and an interior camera 103. The exterior Camera 101 images the driver's blind spot on the side of the seat next to the driver. The exterior camera 102 images the blind spot on the rear side of the car 100. The interior camera 103 is attached to the back side of a rear-view mirror of the car 100, and obtains an image in the same range as the visual field of the driver. The exterior camera 101, exterior camera 102, and interior camera 103 are imaging apparatuses according to the embodiments of the present invention. Each of the exterior cameras 101 and 102 and the interior camera 103 includes an imaging lens according to the embodiment of the present invention, and an imaging device that converts an optical image formed by the imaging lens into electric signals.

The imaging lenses according to the embodiments and examples of the present invention have aforementioned advantageous effects. Therefore, the sizes of the exterior cameras 101 and 102 and the interior camera 103 are small, and they are produced at low cost. Further, these cameras have wide angles of view, and can obtain high-resolution images of excellent qualities.

So far, the embodiments and examples of the present invention have been described. However, the present invention is not limited to the aforementioned embodiments and examples, and various modifications are possible. For example, the values of curvature radius, surface interval, refractive index, and Abbe number of each lens element are not limited to the numerical values of the aforementioned examples, and may be other values.

In the aforementioned examples, all of the lenses are made of homogeneous material. Alternatively, lenses having refractive index distribution may be used. In the aforementioned examples, the second lens L2 through the fifth lens L5 are refractive-type lenses having an aspheric surface. Further, diffraction optical elements may be formed on one or a plurality of surfaces.

In the embodiment of the imaging apparatus, a case in which the imaging apparatus of the present invention is applied to an in-vehicle camera was described with reference to the drawing. However, the use of the imaging apparatus of the present invention is not limited to the in-vehicle camera. The imaging apparatus of the present invention may be applied to a camera for a mobile terminal, a monitor camera, and the like.

What is claimed is:

1. A five-lens imaging lens consisting essentially of:
a negative first lens;
a negative second lens having a concave surface facing the image side of the imaging lens;
a positive third lens;
an aperture stop;
a positive fourth lens; and
a fifth lens having a concave surface facing the object side of the imaging lens, which are arranged sequentially from the object side of the imaging lens,
wherein at least one of the second lens, the fourth lens and the fifth lens has at least an aspheric surface, and
wherein the Abbe number of the material of the third lens and the Abbe number of the material of the fifth lens for d-line are less than or equal to 30, and wherein the Abbe number of the material of the fourth lens for d-line is greater than or equal to 40, and wherein the following formula (1) is satisfied:

$$1.0<(R3-R4)/(R3+R4) \quad (1),$$

where

R3: the paraxial curvature radius of an object-side surface of the second lens, and R4: the paraxial curvature radius of an image-side surface of the second lens.

2. A five-lens imaging lens, as defined in claim 1, satisfying the following formula (2):

$$1.0<D3/f<1.6 \quad (2),$$

where

D3: the center thickness of the second lens, and f: the focal length of the entire system of the imaging lens.

3. A five-lens imaging lens, as defined in claim 1, satisfying the following formula (3):

$$2.0<D2/f<4.0 \quad (3),$$

where

D2: an air gap between the first lens and the second lens on the optical axis of the imaging lens, and f: the focal length of the entire system of the imaging lens.

4. A five-lens imaging lens, as defined in claim 1, satisfying the following formula (4):

$$1.0<D1/f<3.0 \quad (4),$$

where

D1: the center thickness of the first lens, and f: the focal length of the entire system of the imaging lens.

5. A five-lens imaging lens, as defined in claim 1, satisfying the following formula (5):

$$13.0<L/f<19.0 \quad (5),$$

where

L: a length from the vertex of an object-side surface of the first lens to an image plane on the optical axis of the imaging lens, and f: the focal length of the entire system of the imaging lens.

6. A five-lens imaging lens, as defined in claim 1, wherein an object-side surface of the first lens is convex, and wherein the following formula (6) is satisfied:

$$0.4<(R1-R2)/(R1+R2)<1.0 \quad (6),$$

where

R1: the paraxial curvature radius of the object-side surface of the first lens, and R2: the paraxial curvature radius of an image-side surface of the first lens.

7. A five-lens imaging lens, as defined in claim 1, satisfying the following formula (7):

$$1.1<(R8-R9)/(R8+R9)<2.0 \quad (7),$$

where

R8: the paraxial curvature radius of an object-side surface of the fourth lens, and R9: the paraxial curvature radius of an image-side surface of the fourth lens.

8. A five-lens imaging lens, as defined in claim 1, satisfying the following formula (8):

$$0.3<R9/R10<0.9 \quad (8),$$

where

R9: the paraxial curvature radius of an image-side surface of the fourth lens, and R10: the paraxial curvature radius of the object-side surface of the fifth lens.

9. A five-lens imaging lens, as defined in claim 1, wherein the center thickness of the first lens is greater than or equal to 1.5 mm.

10. An imaging apparatus comprising:

the lens as defined in claim 1.

11. An imaging lens comprising:

a negative first lens;

a negative second lens that is a double concave lens;

a positive third lens;

an aperture stop;

a positive fourth lens; and a fifth lens that is a meniscus lens having a concave surface facing the object side of the imaging lens, which are arranged sequentially from the object side of the imaging lens, wherein at least one of the second lens, the fourth lens and the fifth lens has at least an aspheric surface, and wherein the Abbe number of the material of the third lens and the Abbe number of the material of the fifth lens for d-line are less than or equal to 30, and wherein the Abbe number of the material of the fourth lens for d-line is greater than or equal to 40, and wherein an object-side surface of the second lens has negative power at the center thereof, and negative power at an effective diameter edge is weaker than the negative power at the center thereof.

12. An imaging lens, as defined in claim 11, satisfying the following formula (2):

$$1.0<D3/f<1.6 \quad (2),$$

where

D3: the center thickness of the second lens, and f: the focal length of the entire system of the imaging lens.

13. An imaging lens, as defined in claim 11, satisfying the following formula (3):

$$2.0<D2/f<4.0 \quad (3),$$

where

D2: an air gap between the first lens and the second lens on the optical axis of the imaging lens, and f: the focal length of the entire system of the imaging lens.

14. An imaging lens, as defined in claim 11, satisfying the following formula (4):

$$1.0<D1/f<3.0 \quad (4),$$

where

D1: the center thickness of the first lens, and f: the focal length of the entire system of the imaging lens.

15. An imaging lens, as defined in claim 11, satisfying the following formula (5):

$$13.0<L/f<19.0 \quad (5),$$

where

L: a length from the vertex of an object-side surface of the first lens to an image plane, and f: the focal length of the entire system of the imaging lens.

16. An imaging lens, as defined in claim 11, wherein an object-side surface of the first lens is convex, and wherein the following formula (6) is satisfied:

$$0.4<(R1-R2)/(R1+R2)<1.0 \quad (6),$$

where

R1: the paraxial curvature radius of the object-side surface of the first lens, and R2: the paraxial curvature radius of an image-side surface of the first lens.

17. An imaging lens, as defined in claim 11, satisfying the following formula (7):

$$1.1 < (R8-R9)/(R8+R9) < 2.0 \tag{7}$$

where
- R8: the paraxial curvature radius of an object-side surface of the fourth lens, and
- R9: the paraxial curvature radius of an image-side surface of the fourth lens.

18. An imaging lens, as defined in claim 11, satisfying the following formula (8):

$$0.3 < R9/R10 < 0.9 \tag{8}$$

where
- R9: the paraxial curvature radius of an image-side surface of the fourth lens, and
- R10: the paraxial curvature radius of the object-side surface of the fifth lens.

19. An imaging lens, as defined in claim 11, wherein the center thickness of the first lens is greater than or equal to 1.5 mm.

20. An imaging apparatus comprising:
the imaging lens as defined in claim 11.

* * * * *